United States Patent
Golan et al.

(10) Patent No.: US 10,715,554 B2
(45) Date of Patent: Jul. 14, 2020

(54) TRANSLATING EXISTING SECURITY POLICIES ENFORCED IN UPPER LAYERS INTO NEW SECURITY POLICIES ENFORCED IN LOWER LAYERS

(71) Applicant: EMC IP Holding Company LLC, Hopkinton, MA (US)

(72) Inventors: Oron Golan, Meitar (IL); Kfir Wolfson, Beer Sheva (IL); Amos Zamir, Beer Sheva (IL); Aviram Fireberger, Moshav Mavkiim (IL); Udi Shemer, Kfar Saba (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 174 days.

(21) Appl. No.: 16/143,250

(22) Filed: Sep. 26, 2018

(65) Prior Publication Data
US 2020/0099721 A1 Mar. 26, 2020

(51) Int. Cl.
*H04L 29/06* (2006.01)

(52) U.S. Cl.
CPC .......... *H04L 63/20* (2013.01); *H04L 63/0236* (2013.01); *H04L 63/145* (2013.01)

(58) Field of Classification Search
CPC .......................... H04L 63/16; H04L 63/0263
See application file for complete search history.

(56) References Cited

U.S. PATENT DOCUMENTS

| | | | |
|---|---|---|---|
| 2008/0215518 A1* | 9/2008 | Matsuda | H04L 63/02 706/47 |
| 2009/0077621 A1* | 3/2009 | Lang | H04L 63/20 726/1 |
| 2014/0096188 A1* | 4/2014 | Mont | G06Q 10/0637 726/1 |
| 2014/0282849 A1* | 9/2014 | Collison | H04L 63/08 726/1 |
| 2015/0236917 A1* | 8/2015 | Anderson | H04L 63/20 709/223 |
| 2020/0099721 A1* | 3/2020 | Golan | H04L 63/0236 |

* cited by examiner

*Primary Examiner* — Ponnoreay Pich
(74) *Attorney, Agent, or Firm* — Staniford Tomita LLP

(57) ABSTRACT

Existing policies enforced at or above an operating system (OS) layer of a device are obtained. Translation rules are stored that include data structure descriptions of conditions, corresponding actions performed when the conditions are satisfied, and attributes specified in the existing policies, and attributes of one or more layers below the OS layer that are relevant to policy enforcement in the one or more layers below the OS layer. The existing policies are parsed using the data structure descriptions to identify the conditions, corresponding actions, and attributes specified in the existing policies. New policies are generated that are consistent with the existing policies. The new policies include the identified attributes specified in the existing policies and the attributes relevant to policy enforcement in the one or more layers below the OS layer. The new policies are enforced in the one or more layers below the OS layer.

20 Claims, 10 Drawing Sheets

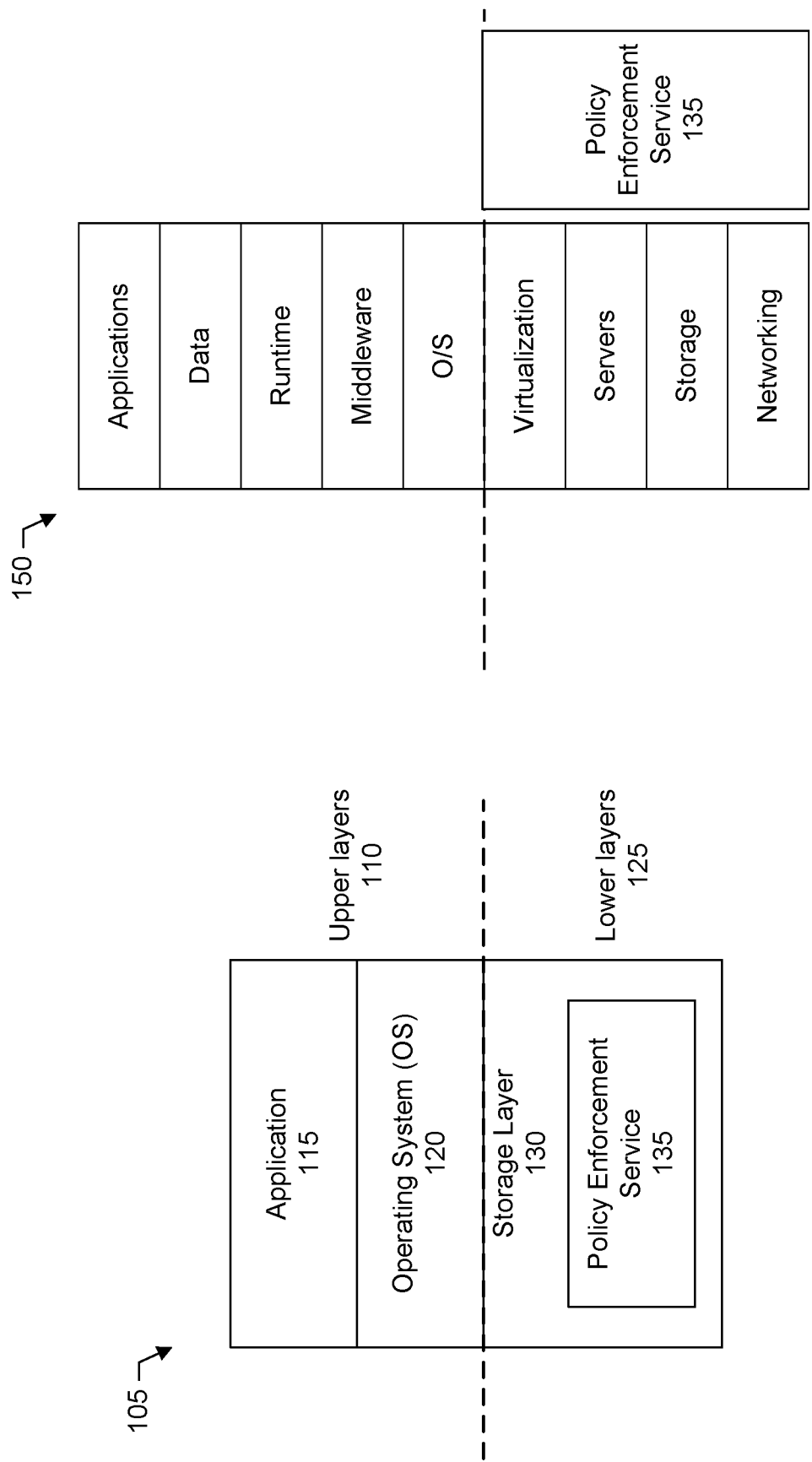

TRANSLATING EXISTING SECURITY POLICIES ENFORCED IN UPPER LAYERS INTO NEW SECURITY POLICIES ENFORCED IN LOWER LAYERS

TECHNICAL FIELD

The present invention relates generally to information processing systems, and more particularly to protecting an organization from security threats including data breaches, unauthorized access, malware, and the like.

BACKGROUND

Security policies are typically designed and enforced at upper levels of a protocol stack. For example, a device may include an agent running within an operating system (OS) layer of the device to block security breaches such as running applications that an organization has banned, accessing confidential data that the end-user is not authorized to access, and so forth.

The development of virtualization technologies such as virtual machine environments and container environments has made it relatively easy to bypass agent-level enforcement. The ease with which these virtual environments can be created in order to thwart agent-level policy enforcement exposes the organization to both internal and external threats. For example, an employee end-user may create a virtual machine, and withhold installing the agent-level policy enforcer in the newly created virtual machine so that a banned application may be installed.

An organization may have invested a great amount of time and resources to develop many dozens, hundreds, or even thousands of agent-level security policies. Nonetheless, such security policies may be rendered ineffective from the threat posed by virtualization and container technology.

There is a need for improved systems and techniques for policy enforcement techniques that are not so easily bypassed, are cost-effective, and allow an organization to recoup its investment spent developing agent-level security policies.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 1 shows a layer diagram of an information processing system having storage layer policy enforcement services, according to one or more embodiments.

FIG. 1A shows an example of a cloud computing layer model.

DETAILED DESCRIPTION

Figure 2:
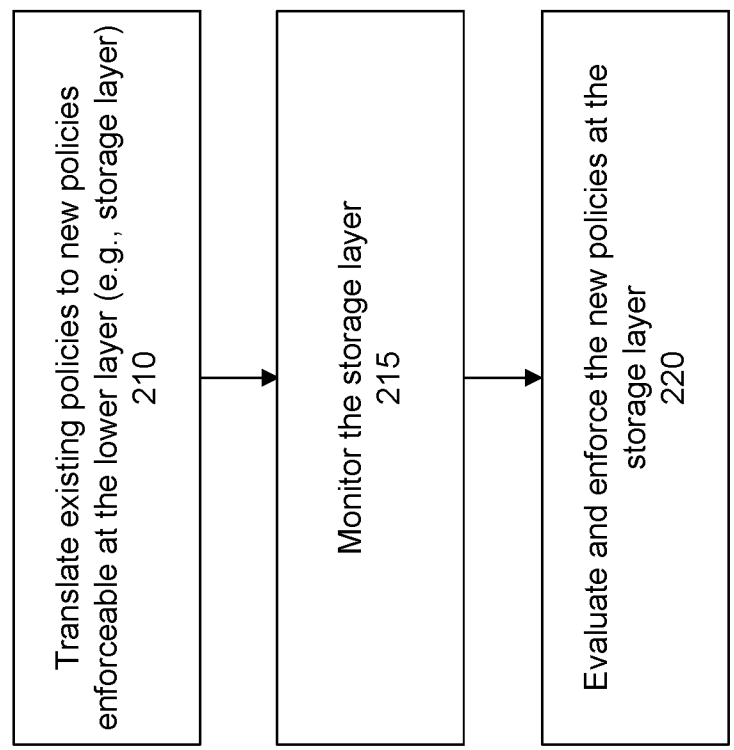
FIG. 2 shows an overall flow for storage layer policy enforcement services, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network.

Disclosed herein are methods and systems for translating existing security policies that are enforced in upper layers of a protocol stack into new security policies that are enforced in lower layers of the protocol stack. Generally, an information processing network or architecture for a computer system (e.g., cloud computing system) can be viewed as a hierarchical set of layers. Each layer serves the layer above it and, in turn, is served by the layer below it. The flow of information starts from upper layers, proceeds down to next lower layers, and then back up the lower layers to the upper layers.

For example, FIG. 1 shows a simplified layer diagram for a computing device 105. The computing device may be, for example, a virtual machine, desktop, laptop, tablet computer, virtual desktop infrastructure (VDI) machine, and so forth. The computing device may be referred to as an end-point.

Upper layers 110 may include an application layer 115 and operating system (OS) layer 120. Lower layers 125 may be referred to collectively as a storage layer or storage infrastructure layer 130. In an embodiment, the storage layer includes low-level domains including one or more backend components that handle persistent information of the devices, networking components, and the like. Examples include a physical storage array or file system server, storage virtualization layer, a data protection system (e.g., a backup system, or replication system), IO path monitoring software, and others. In an embodiment, storage layer (or storage level) can refer to different layers within a data center. For example, depending upon the implementation, a storage layer may include a physical storage array, file system server, an application inside the storage array, storage virtualization layer (e.g., inside the hypervisor such as in cases of virtual machine or container monitoring), and so forth.

An application program executing on a computing device may be considered to reside at the top of the layers of the protocol stack. The application program generates a request to access a resource. The resource may be, for example, a network so that data may be sent from the computing device to another computing device, a storage device so that data may be saved, persisted, or written to the storage device, and so forth.

FIG. 1A shows further detail of a cloud computing layer model 150 or virtualization layer architecture. These layers sit on top of one another and include, from top to bottom, applications, data, runtime, middleware, operating system, virtualization, servers, storage, and networking.

In a specific embodiment, policy enforcement services for a customer organization are provided in infrastructure components within an Infrastructure-as-a-Service (IaaS) cloud computing model. IaaS is a form of cloud computing that provides virtualized computing resources over the internet. In an IaaS model, a cloud provider hosts the infrastructure components traditionally present in an on-premises data center, including servers, storage and networking hardware, as well as the virtualization or hypervisor layer. Thus, these layers may be referred to as the IaaS layer. The IaaS provider may supply a range of services to accompany those infrastructure components. These can include detailed billing, monitoring, log access, load balancing and clustering, as well as storage resiliency, such as backup, replication and recovery. In a specific embodiment, systems and techniques are provided that allow the IaaS provider to provide security to the customer organization including, for example, protection against malware, unauthorized data access, and other security threats.

IaaS customers access resources and services through a wide area network (WAN), such as the internet, and can use the cloud provider's services to install the remaining elements of an application stack. For example, the user can log in to the IaaS platform to create virtual machines (VMs); install operating systems in each VM; deploy middleware, such as databases; create storage buckets for workloads and backups; and install the enterprise workload into that VM. Customer organizations can then use the provider's services to track costs, monitor performance, balance network traffic, troubleshoot application issues, manage disaster recovery and more. In an embodiment, workloads may access storage without having to know where the data is stored, what type of device is storing the data, or whether the storage is attached directly to the system hosting the workload, to a local storage server (e.g., LAN), or to storage in the cloud.

Figure 1B:
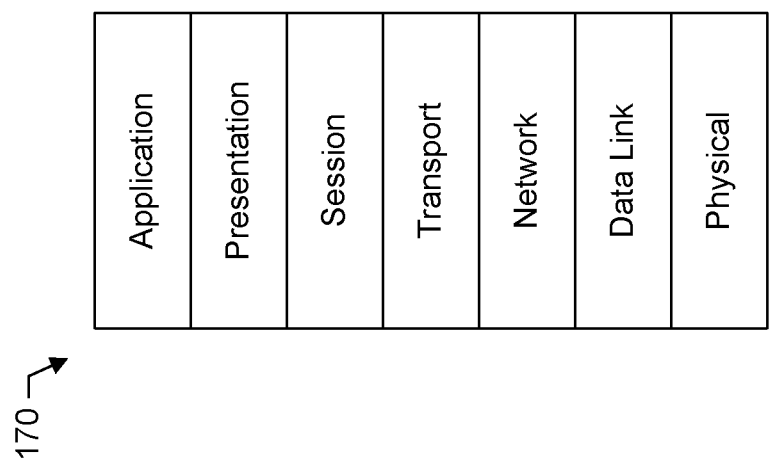
FIG. 1B shows an example of the Open System Interconnect (OSI) layer model.

Another example of a layer model is the Open Systems Interconnection (OSI) Reference Model 170 as shown in FIG. 1B. The OSI Reference Model includes seven layers including (in decreasing order) application (layer 7), presentation (layer 6), session (layer 5), transport (layer 4), network (layer 3), data link (layer 2), and physical (layer 1). Each protocol in the stack applies its own control data through a process referred to as data encapsulation. Data encapsulation refers to the process whereby each protocol in the stack receives the data handed down to it from the layer above and packages it by applying a header. A header includes additional information used to implement the particular features of that protocol.

When, for example, the application program generates a request to access a network to send data to another computing system, the request is passed down to the application-layer protocol. When the request is passed down to the application-layer protocol, a header, containing the control data needed by the same corresponding protocol at the receiving computing system, is added to the request. Once the header is applied, the original request may be referred to as the payload. The protocol at the application-layer generates a structure, including the header and payload, which it passes down to the next layer, and so forth down to each successive lower layer, until a structure referred to as a packet is created. The bottom of the protocol stack is the interface to the network medium itself, e.g., a cable or phone line.

Another example of a layer model is the TCP/IP protocol as used in a TCP/IP communications environment. The TCP/IP stack includes four layers including an application, transport, Internet, and link. The application layer generally maps to the application and presentation layers of the OSI model. The transport layer generally maps to the session and transport layers of the OSI model. The Internet layer generally maps to the network layer of the OSI model and is responsible for the packaging, addressing, and routing of data to its destination. The link layer includes protocols for the transmission of IP data over the network medium.

In an embodiment, the term "layer" as used herein is in accord with a virtualization layer model such that a lower layer is closer to the physical layer than an upper layer. The physical layer defines the electrical and physical specifications of the components and communication medium (e.g., copper cable, optical cable, wireless, and so forth). Thus, an upper layer is closer to the end-user than a lower layer. The upper layer is further from the physical layer than the lower layer. It is not necessary that the various layer models such as cloud computing layer model, virtualization layer model, or OSI model be followed exactly.

In a specific embodiment, the layer is a logical software package (that may run on separate hardware) which performs a dedicated set of operations and sends the IO down to the next layer/level. In some cases, the previous layer's "packet" is encapsulated as a payload inside another packet to the next layer, like with OSI layers, but this is not necessarily always the case—especially in the context of virtualization layers. The IO may proceed down to the next layer, by sending it in the appropriate protocol, which might be internal (within the hypervisor) or external like Small Computer System Interface (SCSI) or Internet Small Computer System Interface (iSCSI) (to the storage) or Network File System/Server Message Block (NFS/SMB) to the Network-attached storage (NAS) file system. In a specific embodiment, policy enforcement services are provided within the IaaS architecture layer (e.g., below the OS layer). For example, policy enforcement services may be provided in one or more of the virtualization, servers, storage, or networking layers as shown in the example of FIG. 1A.

Enforcement of an organization's security policies typically occurs in upper layers such as at or above an operating system (OS) layer of a device. Enforcement at or above the OS layer, however, is problematic because enforcers operating in the upper layers can be bypassed relatively easily using virtualization technologies. For example, consider that the computing device having the enforcer is a virtual machine. A virtual machine is a software abstraction of a real computer and is hosted by a host machine. The enforcer is responsible for blocking malware. Malware can be any application program or software that the organization has banned or forbidden. Malware may include not only computer viruses, but also any other benign or seemingly benign application.

For example, the organization may mark various media players as forbidden or banned because such applications may include spyware. The organization may mark games as banned because the organization does not want its employees playing games while at work. In some cases, however, a determined employee may bypass the enforcer by running the banned application inside another virtual machine or on a newly created disk partition which the enforcer does not have permission to access. Running a malicious application can expose the organization to a plethora of security threats including, for example, data theft (e.g., user passwords, credit card information), geopolitical interference, intellectual property theft, and so forth.

In a specific embodiment, systems and techniques provide security policy enforcement services 135 at the storage layer or, more specifically, in one or more layers or low-level domains below the operating system layer of the device (e.g., virtual machine) (see, e.g., FIGS. 1 and 1A). Security policy enforcement at the storage layer is much more difficult to bypass as compared to security policy enforcement at or above the operating system layer. In a specific embodiment, existing security policies that the organization has already defined and that may be enforced at the upper levels (e.g., at or above the OS layer) are translated into new security policies—consistent with the existing security policies—but are enforced instead at the storage layer (e.g., in one or more layers or domains below the OS layer).

Generating the new security policies by translating the existing security policies helps to enable reuse of the existing policy definitions and thus reduce the amount of rework required for policy enforcement at the storage layer. The existing security policies may continue to be enforced at or above the OS layer for additional levels of protection. In other cases, however, an organization may disable or discontinue enforcement at or above the OS layer once policy enforcement at the storage layer has been initiated in order to reduce administrative overhead of policy management, conserve compute resources, and so forth.

More particularly, a computer security policy defines the goals and elements of an organization's computer systems. Most policy enforcement tools require an agent running on the guest system. There are many ways to bypass the policy enforcement resulting in security and data breaches. In a specific embodiment, systems and techniques are provided for scanning the input/output (IO) streams in data protection products and other storage-layer products for patterns that violate security policies. This takes the control out of the guest OS and places it as part of the infrastructure.

Policy enforcement in computer security may include a tool that provides centralized, integrated management of all the security devices (both physical and virtual) of the organization, thereby providing the ability to combine threat intelligence from different solutions and act on that intelligence from one management point.

The policy enforcer may be implemented in two parts. A first part may include a server application for policy management definition. A second part may include a client application that is located on the end points of the users and tries to implement and validate the rules defined in the management server.

Organizations may implement the policy using a set of tools that validates a set of enforcement types in the organization including, for example, 1) Access (e.g., authenticating the user that logs in into the computer); 2) Control over processes (e.g., applications that are allowed on the computer, applications that are forbidden on the computer); 3) Labels (e.g., allowed and forbidden command per user label); 4) Allowed websites and forbidden websites; and 4) Ways to transfer data from the computer to others. Different tools may handle different policy enforcement types. For example, Active Directory (AD) as provided by Microsoft Corporation may handle access enforcement. There can be a policy server and agent that validates control and labels on each of the endpoints, and so forth.

Devices which may require policy enforcement by an organization range from virtual machines, VDI machines, laptops and desktops to mobile devices such as cell phones and tablets. As discussed above, in an embodiment, "storage layer" refers to one or more of the backend components handling the persistent information of the devices. Examples include a physical storage array or file system server, the storage virtualization layer, a data protection solution (backup or replication), replication module or software package within a hypervisor (e.g., "RecoverPoint splitter" as provided by Dell EMC of Hopkinton, Mass.), dedicated software for monitoring the IO path, and more.

In an embodiment, any service running in the storage layer will have access to the monitored device data and can be agnostic to the operating system and hardware of each device. The storage layer might have direct access to the device data or only access to a stream of data changes, e.g., in data protection solutions.

As discussed end-point enforcer agents have several drawbacks. One drawback is that enforcers can be bypassed easily. Security policies are created to defend organizations and bypassing them might introduce security vulnerabilities. Enforcers run on the end-point machine with high permission and check if policy rules given from the server are violated on the client.

Due to virtualization and container technology it has now become relatively easy to bypass the enforcer by simple techniques such as running the forbidden application inside a container or VM. Another technique to bypass an end-point enforcer agent includes running the application on a newly created disk partition which the enforcer has no permissions to access, and thus could avoid detection by the agent. (For example in Windows OS, if the enforcer has permission only on C partition, creating a new D partition will cause the enforcer to be blind to applications on the D partition.). In other words, the new D partition may not be visible to the enforcer. These techniques are only some of the techniques that exist to bypass the client enforcer.

For example, let's say a well-known application for remote control has a known Common Vulnerabilities and Exposures (CVE®). Using this CVE, an unauthorized user could obtain access on the production machine without any authentication required. The organization's security team sets a policy which updates the enforcer to deny or block that application from running on the production machines, but some users that are not aware of the security issue that this application has might bypass the enforcer and run the application anyway. From the users' perspective, they might feel that it is required for their work, but they are actually putting the whole organization infrastructure at risk. Thus, it is desirable to be able to detect and block such cases.

Another drawback of enforcer agents is that enforcer agents are OS-specific. Such enforcer agents may be designed to run inside the OS. Thus, enforcers have to be developed separately for each operating system. Typically there will also be different flavors with every new OS version, due to the differences in the way operating systems allow privileged user operations. With each new OS version, developers may have to rewrite the enforcer agents.

However, a lower layer solution, such as described herein, can be OS agnostic, or require only one version per OS type (e.g., one for all Windows, one for all Linux, and so forth). Enforcement can be agnostic to the device OS and hardware system because enforcement services are run at a lower layer such as on lower level virtual or physical device.

FIG. 2 shows an overall flow for security policy enforcement by storage infrastructure layer detection. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 210, existing security policies that are enforced at or above the OS layer of a device are translated into new security policies that are enforceable below the OS layer (e.g., at the storage layer). The existing policies may be referred to as security agent-level policies. In a specific embodiment, a method includes translating existing organization security agent-level policies to matching patterns and saving them in a pattern database (DB). Further discussion is provided below.

In a step 215, the storage layer is monitored. In a specific embodiment, at regular intervals or on demand, the device disk or file system is scanned, at the storage layer, either as part of the replication/backup process or by running inside the storage/virtualization/network file system backend. In a specific embodiment, scanning occurs in real-time, near real-time, or occurs in conjunction with replication. For example, once an IO command is issued from the OS layer of the device and before the IO is received by an underlying storage component (e.g., disk or LUN), the IO may be scanned for malware or other malicious behavior. In another specific embodiment, scanning is performed as an after the fact activity. For example, the scanning may be performed on data that has already been written to a storage device. The scanning may be performed on a production copy of data. Instead or additionally, the scanning may be performed on a backup copy of the data. Scanning the backup copy can help to limit interference with the production system.

In a step 220, the new security policies are evaluated and enforced at the storage layer. When a pattern is found, one or more actions are performed according to policy. These actions may vary depending upon the particular level in the storage layer that policy enforcement is implemented. In a specific embodiment, the policy enforcement service leverages the access afforded at the storage level in order to enforce global policies or notify of policy infringement. Some examples of policy actions or behavior include one or more of the following:

1) Notify about the suspected infringement. The notification can be to the device users themselves, the organization information technology (IT) or security department, or both.

2) Block the IO operations, or access to the infringing files.

The first type of action (e.g., notify) may be used, for example, in data protection solutions, services, or products, where it may not be desirable to interfere with the production device or there is no access to the production device, but there is access to a backup or stream of IOs of the device persistent data.

The second type of action (e.g., block) may be used when policy enforcement is integrated directly in the file system, storage or virtualization layer.

The policy enforcement can differ between devices. For example, policy enforcement may differ based on device type (e.g., VM versus laptop), department the device belongs to, operation system, time of day, and so forth.

Some use-cases of policies and matching pattern examples are as follows. There can be blacklist type policies. Blacklist type policies specify that installation of a specific application or certain file types are not allowed. There can be whitelist type policies. Whitelist type policies allow only certain OS updates and drivers. There can be system type policies. System type policies specify that system directories are not supposed to be changed unless at certain predefined times of update interval.

There can be patterns for certain files (e.g., malware). When policy enforcement services are at a block-level of the storage layer and not the file-system level of the storage layer, searches may be performed for a specific set of hashes of the file contents, of a predefined size. IO alignment is typically similar between different installations of the same OS, and it is not required that all hashes fit or match. Rather, only a certain percentage above a configurable threshold (e.g., 30 percent) may be required to match for a notification alert or other action taken. The notification can, for example, alert that there is a high chance of infringement. In a specific embodiment, patterns that examine timeframes, may detect when changes to certain directories or disk areas are performed.

In a specific embodiment, the storage layer enforcement system or service allows administrative users to customize policies and define the list of files to be searched; and does not limit the search to specific predefined list of files. Changes to specific directories at certain times can be detected. The storage layer enforcement service can work with a global policy that correlates security aspects of the whole organization. The policy enforcement service allows for adding features and adjusting to organizational needs in real time, unlike antiviruses or similar products which are not customizable.

Figure 3:
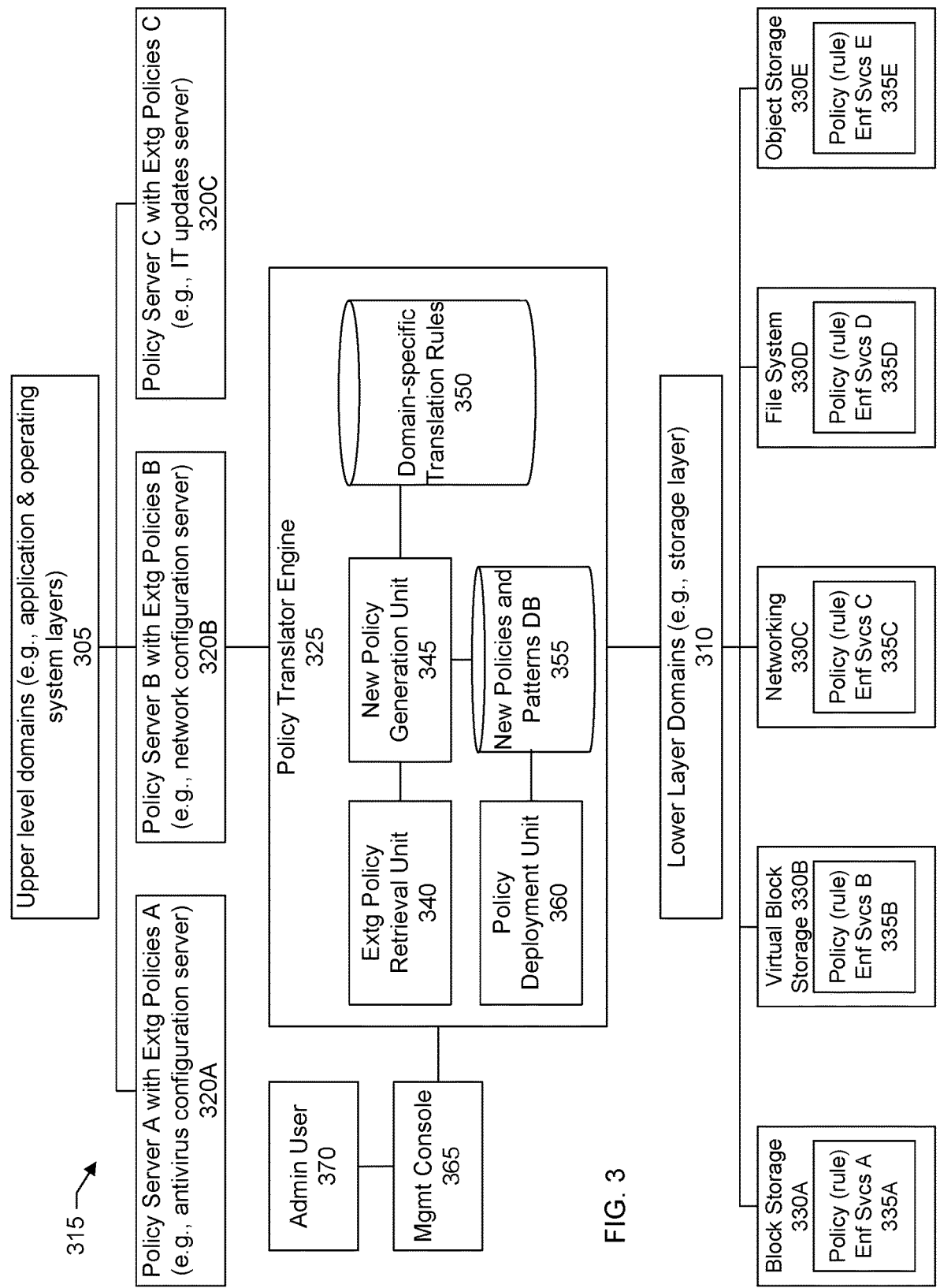
FIG. 3 shows a block diagram of a policy translator engine, according to one or more embodiments.

FIG. 3 shows a block diagram for translating existing security policies that are enforced in upper level domains (e.g., application and operating system layers) 305 into new security policies that are enforceable in lower level domains of the storage layer 310. As shown in the example of FIG. 3, an organization may have any number of existing policy servers 315 with existing policies that provide different types of enforcement. These existing policy servers (along with their existing policies) may be from different vendors and may be directed towards various different types of components requiring protection from security threats.

The existing policies may have been configured, specified, written, or defined using a component- or vendor-specific language, format, enforcement model, or data structure. A data structure can include a collection of attributes, data values, relationships, and the functions or operations that can be applied to the data. A first existing policy may have been defined according to a first data structure. A second existing policy may have been defined according to a second data structure, different from the first data structure. These differences increase management and administrative overhead. As a result, it is very difficult for an organization to assess vulnerability at the organization-level because enforcement may be distributed across various end-points and spread across different security products from different vendors. Moreover, as discussed above, policy enforcement at the end-point level can often be easily bypassed.

Some examples of existing policy servers (with associated existing policies) that may be found in an organization include an antivirus configuration server 320A, network configuration server 320B, IT update server 320C, and so forth. As shown in the example of FIG. 3, in a specific embodiment, there is a policy translator engine 325. The policy translator engine is responsible for obtaining the existing security policies that are enforced in the upper level domains and automatically translating the existing security policies into new security policies—consistent with the existing security policies–and enforceable in the lower level domains or storage layer. Some examples of low-level domains include block storage 330A having an associated policy (rule) enforcement service 335A, virtual block storage 330B having an associated policy (rule) enforcement service 335B, networking 330C having an associated policy (rule) enforcement service 335C, file system 330D having an associated policy (rule) enforcement service 335D, and object storage 330E having an associated policy (rule) enforcement service 335E.

In particular, the policy translator engine may include several modules including a policy retrieval unit 340, new policy generation unit 345, domain-specific translation rules DB 350, new policies and patterns DB 355, and policy deployment unit 360. A management console 365 may be coupled to the policy translator engine. The management console provides a user interface through which an administrator 370 may manage policy translation. It should be appreciated that the modules and components shown in FIG. 3 may be functional and there can be many different hardware and software configurations to implement the functions described.

The policy retrieval unit is responsible for collecting, gathering, or obtaining the various existing security policies. Existing policies may be obtained by, for example, through an application programming interface (API) exposed by each of the different existing policy servers. In a specific embodiment, the policy retrieval unit copies the existing policies for policy translation to a staging area of the policy translator engine. The operation and functioning of the various existing policy servers is not affected during the translation process. The existing policy servers can continue with normal enforcement operations above the storage layer during the translation process. Thus, there is little to no disruption to the organization.

The policy generation unit is responsible for generating or creating new security policies, consistent with the existing security policies, that are enforceable in one or more of the lower layer domains. In a specific embodiment, the policy generation unit uses the translation rules stored in the translation rules database to parse and understand the information contained in the existing security policies and then generate new security policies including new conditions and attributes that are relevant to or associated with policy enforcement in the one or more lower layer domains. In a specific embodiment, the policy translation process is automated by creating a set of rules or translation rules that look at or examine attributes in the existing or original policy, and then generate a domain policy that fits (i.e., a new policy consistent with the existing or original source policy).

In a specific embodiment, the translation rules include domain-specific knowledge or information in order to deduce what the lower-layer policies should be and then enforce them. The policy translator engine receives as input an existing policy in one domain (e.g., application or OS level) and renders a different policy, consistent with the existing policy, but in a very different domain (e.g., below the OS level) that is harder to bypass or overcome.

Generally, a policy defines one or more conditions under which access, requests, or operations are granted, allowed, denied, or blocked. These conditions may include attributes such as user or user role, user group, department that the user belongs to (e.g., finance department versus IT department), context information (e.g., time of day), particular files and directories (e.g., security restrictions on system directories), file types (e.g., security restrictions on driver files), operation type, type of device seeking access (e.g., virtual machine versus laptop), and so forth. Conditions may include relational operators to define a relationship between two or more entities. Examples of relational operators include equal to, not equal to, greater than, less than, greater than or equal to, or less than or equal to, and others. Access may be granted (or denied) when a condition is (or is not) satisfied. A policy may take the format <if (CONDITION) is satisfied then ALLOW else BLOCK>.

As discussed, existing policies, however, may include policies from different vendors or policies protecting different components. These different policies may have different data structures, models, formats, and so forth. Because such existing policies are designed to be enforced at the upper layers (e.g., application-level or operating system-level), these policies or conditions within the policies may lack the attributes or parameters for enforcement at the storage layer. Further, such existing policies may include a level of abstraction that is too generalized for enforcement in lower layers, absent the system and processing techniques described herein.

In a specific embodiment, the translation rules define or describe the data structures, models, or formats of the existing policies, including, for example, data structure descriptions of the conditions, corresponding actions performed when the conditions are (or are not) satisfied, and attributes that may be found in the existing policies. Knowledge of the data structures and formatting of existing policies may be referred to as domain-specific knowledge. Such knowledge may be gathered by reviewing documentation, release notes, administration manuals, and so forth that may be released by a vendor of the policy server.

Domain-specific knowledge may further include specific information about the underlying backend components or physical entities such as block storage (e.g., volume and offset), virtual block storage (e.g., virtual machine, virtual disk, and offset), networking components (e.g., ports, protocol, source IP address, destination IP address, and subnet), file system (e.g., directories, files, and IO operations), or object storage (e.g., objects, and IO operations). These lower-level details, characteristics, and specifics may not be present in the existing policies because the existing policies are designed to be enforced at higher domains.

The domain-specific knowledge allows for deducing an existing policy enforced at an upper domain (e.g., upper level of abstraction, such as, at or above an OS layer) into a new policy enforceable in a lower-level domain. In a specific embodiment, the translation rules further include attributes, characteristics, or parameters associated with low-level domains of the storage layer that are relevant to policy enforcement at the low-level domains of the storage layer. Such attributes may be associated with lower-levels of abstraction. These attributes may be inserted into the new policies or, more particularly, into the new conditions of the new policies. In other words, these low-level attributes may be used to form new conditions relevant to evaluation and enforcement at the backend components. The translation rules may include logic, instructions, commands, and so forth for analyzing existing policies and generating new policies consistent with the existing policies.

For example, an existing system update policy for a Windows Update server may include configuration information specifying that Windows system updates are to be performed only between 2:00 am and 3:00 am. A translation rule to translate the existing system update policy into a new policy enforceable at a file system of a network attached storage device (NAS) may include an attribute specifying a particular directory because a file system organizes information using directories and files. The specific value of the attribute may be the directory "C:\Windows\system" because that is the directory to which updates to system files are made. Such an attribute may not necessarily be found in the existing policy because the existing policy is enforced at a higher level of abstraction.

In an embodiment, there can be different sets of translation rules for parsing and understanding various existing policies that may have different structures and formats. For example, a first set of translation rules may be used to parse and understand Windows Update server policies and then translate the policies into new policies enforceable at, for example, a network attached storage device, network component, or both. A second set of translation rules may be used to parse and understand antivirus policies from an antivirus vendor and then translate the policies into new policies enforceable at, for example, a block storage device, network component, or both. In other words, the source of an existing policy may define a model of the policy and thus indicate the relevant translation rules to apply. For example, an anti-virus policy may have a model different from a model of a firewall policy or a Windows update policy. A translation rule may include a parameter specifying an enforcement type (e.g., block or notify).

Each low-level domain may be associated with their own specific set of translation rules. For example, there can be a first set of translation rules associated with block storage where the first set of translation rules specify attributes relevant to block storage components. There can be a second set of translation rules associated with virtual block storage where the second set of translation rules specify attributes relevant to virtual block storage components. There can be a third set of translation rules associated with networking components where the third set of translation rules specify attributes relevant to networking components. And so forth.

As discussed above, examples of low-level domains within the storage layer may include block storage, virtual block storage, networking, file system, object storage, and others. Table A below provides some specific examples of each domain where a policy enforcement service may reside or be located in order to analyze the data, traffic, operations and so forth. Based on the analysis, the policy enforcement service performs notification, other enforcement actions (e.g., block, deny, quarantine), or both.

TABLE A

| Domain | Analyzers and enforcement services possible locations |
| --- | --- |
| Block storage | Storage array, storage area network (SAN) fabric, replication systems, backup systems. |
| Virtual Block Storage | Hypervisor (e.g., Device Drivers or dedicated software such as "splitters"), VM, datastore, replication and backups systems. |
| Networking | Firewall, switch, router, network interface controller (NIC), intrusion detection system (IDS), intruder prevention system (IPS). |
| File system | Network attached storage (NAS) storage |
| Object Storage | Object storage software |

Table B below lists some attributes of the different low-level domains that may be relevant to policy enforcement.

TABLE B

| Domain | | Attributes relevant to policy enforcement |
|---|---|---|
| Block storage | 1. | volume, offset. |
| | 2. | data pattern* |
| | 3. | time |
| Virtual Block | 1. | virtual machine |
| Storage | 2. | virtual disk, offset. |
| | 3. | time |
| | 4. | data pattern* |
| Networking | 1. | ports, protocol. |
| | 2. | source and destination internet protocol (IP) addresses, subnet |
| | 3. | data pattern* |
| File system level | 1. | directories, files. |
| | 2. | IO operation (e.g., read, write) |
| | 3. | time. |
| | 4. | data pattern* |
| Object Storage | 1. | objects. |
| level | 2. | IO Operation (e.g., read, write) |
| | 3. | time |
| | 4. | data pattern* |

*Data pattern may include one or more of a hash, regular expression, statistical function, or combinations of these.

In a specific embodiment, the new policy generation unit receives an existing policy that is enforced at or above the OS layer, selects or receives a selection of the appropriate translation rule for understanding the existing policy, and processes the information specified in the existing policy according to the translation rule in order to generate one or more new policies, consistent with the existing policy, that is enforceable at a layer below the OS layer.

In a specific embodiment, the administrator, via the management console, may select an existing policy (e.g., Windows update policy) to translate and a first translation rule to translate the existing policy into a first new policy to be enforced at the file system. The administrator may additionally select a second translation rule to translate the existing policy into a second new policy to be enforced at a network component. Thus, there can be a one-to-many mapping between existing and new policies. In other words, a single existing policy may be translated into two or more new policies enforceable at different low-level domains. A first new policy may be enforceable in a first low-level domain (e.g., file system of a NAS). A second new policy may be enforceable in a second low-level domain (e.g., firewall), different from the first low-level domain. An existing policy may be specified using a first level of abstraction. A new policy, generated from and consistent with the existing policy, may be specified at a second level of abstraction, lower than the first level of abstraction. That is, the existing policy may be specified at a higher level of abstraction than the new policy generated from the existing policy.

Figure 4:
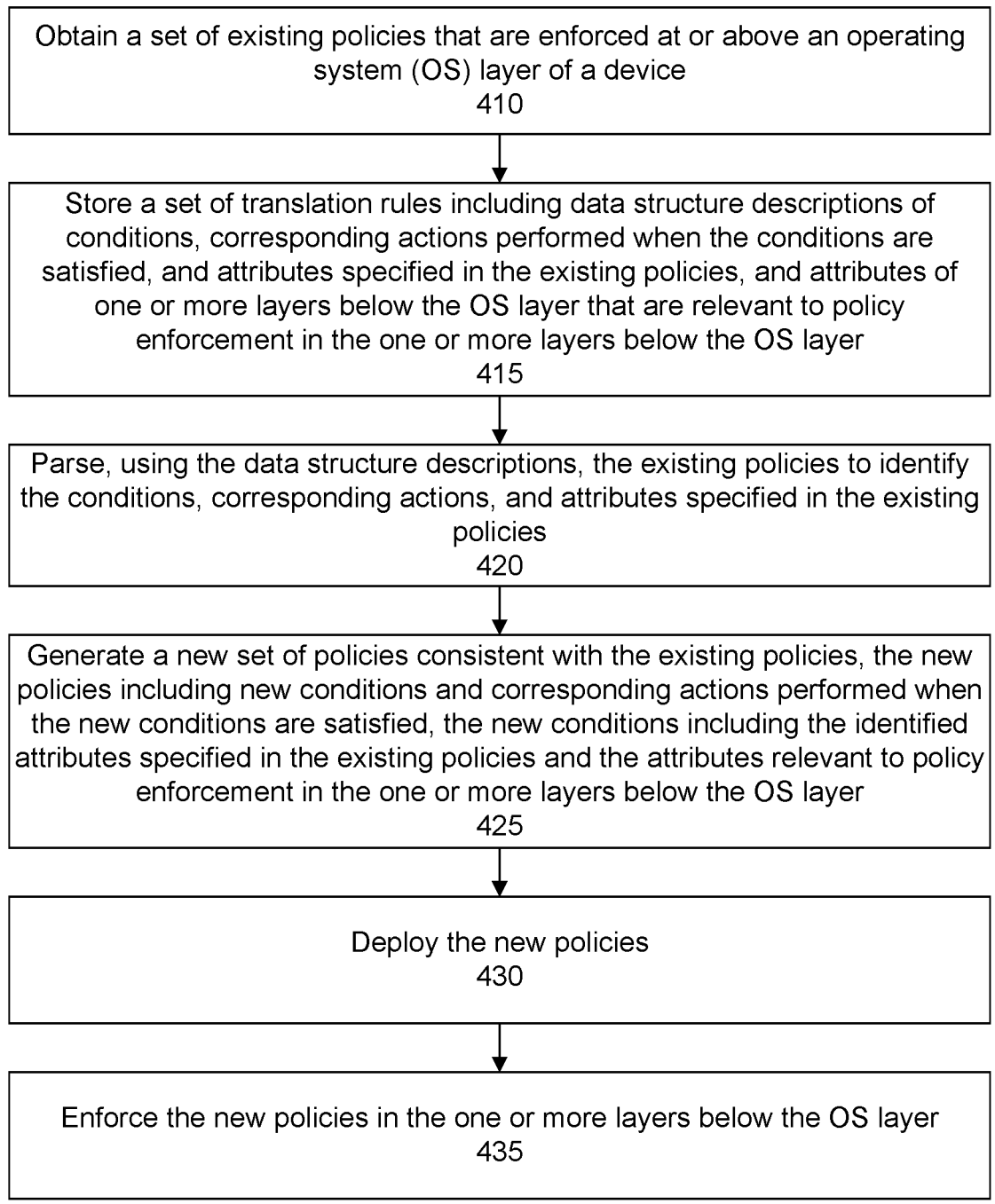
FIG. 4 shows a flow for policy translations, according to one or more embodiments.

FIG. 4 shows a flow of a translation process according to one or more embodiments. In a step 410, a set of existing policies are obtained. The set of existing policies are enforced at or above an operating system (OS) layer of a device. The set of existing policies may be defined at a first level of abstraction.

In a step 415, a set of translation rules are stored. The translation rules include data structure descriptions of conditions, corresponding actions performed when the conditions are satisfied, and attributes specified in the existing policies, and attributes of one or more layers (or low-level domains) below the OS layer that are relevant to policy enforcement below the OS layer. The attributes of these low-level domains may correspond to a second level of abstraction, lower than the first level of abstraction.

Some examples of attributes that may be found in the existing policies include: 1) time; 2) devices (e.g., type of device from which the request for access originated); 3) data hashes; 4) other data patterns or properties (e.g., strings of zeros); 5) application (e.g., name or other identifier of application that is requesting access); 5) application type (e.g., database, OS, driver, and the like); 6) operating system; 7) network ports; 8) type of operation (e.g., read/write); 9) users and user groups (e.g., username or other user identifier); 10) requirement to access external resources such as servers/networks/ports/devices (e.g., requirement to access a certain service on the internet/intra-net).

In a step 420, the translation engine parses, using the data structure descriptions of the translation rules, the existing policies to understand and identify the conditions, corresponding actions, and attributes specified in the existing policies.

In a step 425, the translation engine generates, creates, outputs, infers, or deduces a new set of policies, consistent with the existing set of policies. The new policies include new conditions and corresponding actions performed when the new conditions are satisfied. The new conditions and corresponding actions are based on the existing conditions and corresponding actions in the existing policies. For example, the new conditions may include the attributes or attribute values identified in the existing policies. The new conditions, however, may further include attributes relevant to policy enforcement in the one or more layers below the OS layer. As discussed, the attributes relevant to policy enforcement in the one or more layers below the OS layer may not be found in the existing (e.g., original) policies because the existing policies are designed to be enforced at a higher level of abstraction. Thus, the new policies may be defined at the second level of abstraction, lower than the first level of abstraction.

In a step 430, the new policies are deployed. For example, the new policies may be deployed to lower-level domains such as to block storage, virtual block storage, networking components, file system, object storage, or combinations of these.

In a step 435, the new policies are enforced in the one or more layers (e.g., low-level domains) below the OS layer.

Consider, as an example, the following example policies and then deduction or generation of new policies to be enforced in two different low-level domains. In a first example, there is an existing source policy (e.g., source policy 1000) for a Windows Update server that is configured to perform updates only between 2:00 am and 3:00 am daily, on all enterprise devices running Windows.

Using the translation rules, the system (e.g., translation engine) parses and understands the conditions, corresponding actions, and attributes in the existing source policy and may then create, deduce, or output first and second new policies. The first new policy may be categorized as a file system policy (e.g., file-system policy 1001). The first new policy may specifying generating an alert (or rejection) about a WRITE operation to "C:\Windows\system" directory, if performed outside of the [2:00 am to 3:00 am] timeframe, for disks defined as Windows OS drives.

The second new policy may be categorized as a networking policy (e.g., networking policy 1002). The second new policy may specify that dedicated firewall port number XXX (used for windows update) be closed at all times, except for [1:55 am, 3:05 am] in which the port shall be opened.

In a second example, there is an existing anti-virus policy (e.g., source policy 2000). The existing anti-virus specifies quarantining a file named "winamp.exe" the data of which contains the list of hashes H1, H2, H3, . . . , H100.

The system (e.g., translation engine) uses domain-knowledge (e.g., knowledge from the antivirus domain) to parse and understand the existing policy and may then create or output the following third and fourth new policies. The third new policy may be categorized as a block-storage (or virtual block storage) policy (e.g., block-storage policy 2001). The third new policy may specify generating an alert about consecutive data sequences containing more than a threshold percent (e.g., 30 percent) of the hashes H1 through H100.

The fourth new policy may be categorized as a networking policy (e.g., networking policy 2002). The fourth new policy may specify generating an alert about traffic in a certain connection of which a recent set of packet payload hashes cover more than a threshold percent (e.g., 10 percent) of the hashes H1 through H100.

As discussed, in a specific embodiment, the translation engine uses the translation rules to parse and understand the various existing source policies. The translation engine includes executable scripts or code to parse the various existing source policies and generate new policies. In another specific embodiment, the translation engine may instead or additionally include a natural language processor (NLP) to examine the existing source policies.

Figure 5:
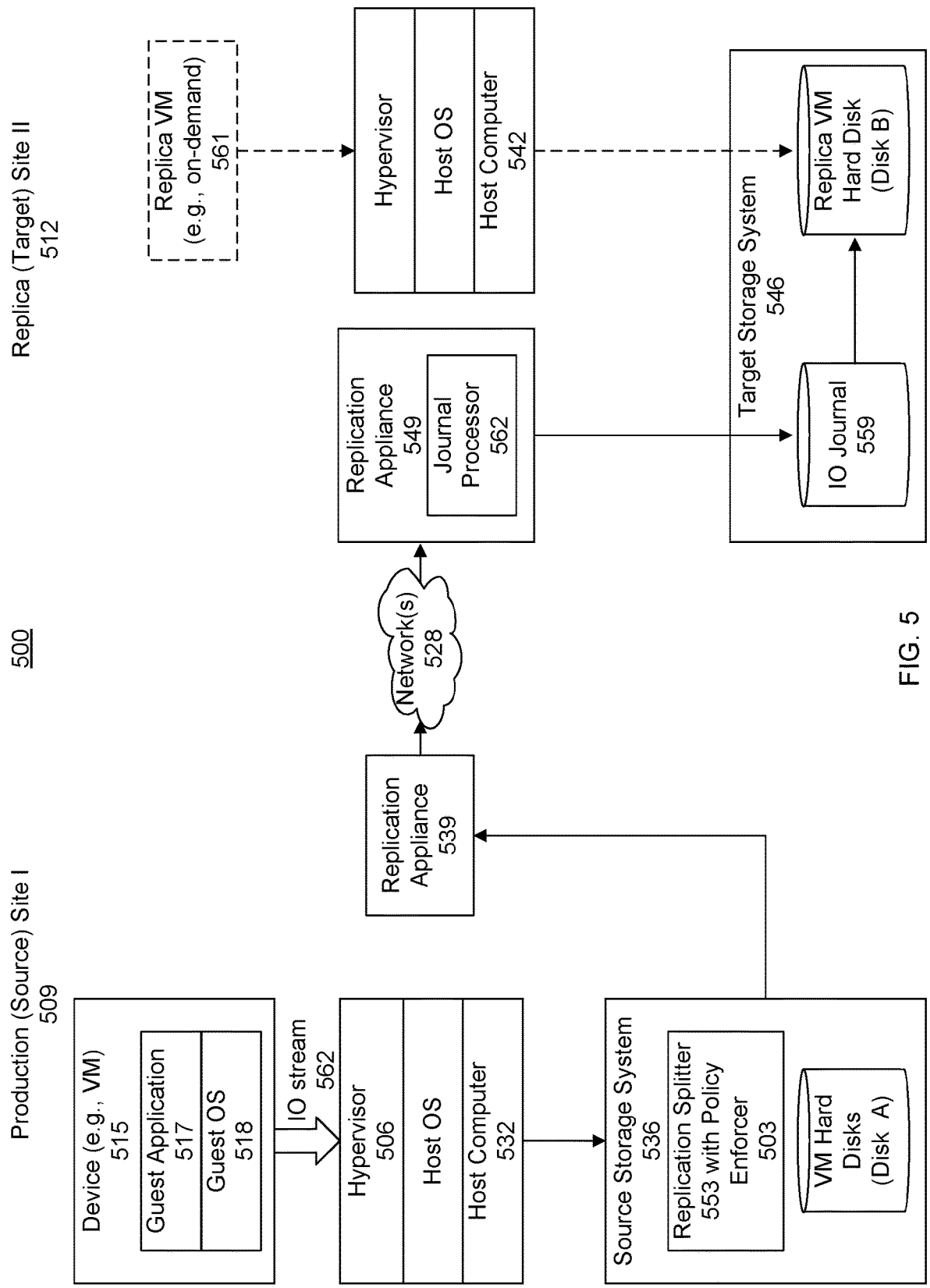
FIG. 5 shows an example of a replication system having storage layer policy enforcement services, according to one or more embodiments.

FIG. 5 shows a block diagram of a data protection or replication system 500 in which lower-layer policy enforcement services 503 may be implemented in a virtual storage domain according to one or more embodiments. A detailed discussion of a data protection or replication system is provided in U.S. patent application Ser. No. 14/108,021, filed Dec. 16, 2013; U.S. patent application Ser. No. 14/108,002, filed Dec. 16, 2013, now U.S. Pat. No. 10,031,690, issued Jul. 24, 2018; U.S. patent application Ser. No. 14/108,032, filed Dec. 16, 2013; U.S. patent application Ser. No. 14/108,053, filed Dec. 16, 2013, now U.S. Pat. No. 9,846,698, issued Dec. 19, 2017; U.S. patent application Ser. No. 14/108,060, filed Dec. 16, 2013, now U.S. Pat. No. 9,720,618, issued Aug. 1, 2017; U.S. patent application Ser. No. 14/108,072, filed Dec. 16, 2013, now U.S. Pat. No. 9,875,162, issued Jan. 23, 2018; and U.S. patent application Ser. No. 14/870,135, filed Sep. 30, 2015, now U.S. Pat. No. 9,917,854, issued Mar. 13, 2018, which are incorporated by reference along with all other references cited.

More particularly, as shown in the example of FIG. 5, there are two sites; Site I, which is a production site 509, on the left, and Site II, which is a replica or backup site 512, on the right. The production site includes a device 515. In a specific embodiment, the device is a virtual machine hosted by a host computer 532. The virtual machine may include guest applications 517 and a guest operating system 518.

Under normal operation the production site is the source side of system 500, and the replica site is the target side of the system. The replica site is responsible for replicating production site data. Additionally, the replica site enables rollback of Site I data to an earlier point in time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target replica site, and Site II starts to behave as a source production site. Such change of replication direction is referred to as a "failover." A failover may be performed in the event of a disaster at the production site, or for other reasons. In some data architectures, Site I or Site II behaves as a production site for a portion of stored data, and behaves simultaneously as a replica site for another portion of stored data. In some data architectures, a portion of stored data is replicated to a replica site, and another portion is not.

The production site and the replica site may be remote from one another, or they may both be situated at a common site, local to one another. Local data protection has the advantage of minimizing or reducing data lag between target and source, and remote data protection has the advantage is being robust in the event that a disaster occurs at the source side.

The source and target sides communicate via a wide area network (WAN) 528, although other types of networks are also adaptable for use.

In a specific embodiment, each side of system 500 includes three major components coupled via a storage area network (SAN); namely, (i) a storage system, (ii) a host computer, and (iii) a data protection appliance (DPA). Specifically with reference to FIG. 5, the source side SAN includes a source host computer 532, a source storage system 536, and a source replication appliance 539. Similarly, the target side SAN includes a target host computer 542, a target storage system 546, and a target replication appliance 549.

Generally, a SAN includes one or more devices, referred to as "nodes." A node in a SAN may be an "initiator" or a "target," or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In a specific embodiment, the host communicates with its corresponding storage system using small computer system interface (SCSI) commands.

System 500 includes a source storage system 536 and target storage system 546. The source storage system may be referred to as a production datastore. The target storage system may be referred to as a replica datastore. Each storage system includes physical storage units for storing data, such as disks or arrays of disks. Typically, storage systems 536 and 546 are target nodes.

In order to enable initiators to send requests to storage system 536, storage system 536 exposes one or more logical units (LU) to which commands are issued. Thus, storage systems 536 and 546 are SAN entities that provide multiple logical units for access by multiple SAN initiators.

Logical units are a logical entity provided by a storage system, for accessing data stored in the storage system. A logical unit is identified by a unique logical unit number (LUN). In an embodiment, storage system 536 exposes a first logical unit (e.g., LU A), and storage system 546 exposes a second logical unit (e.g., LU B).

In an embodiment, LU B is used for replicating LU A. As such, LU B is generated as a copy of LU A. In one embodiment, LU B is configured so that its size is identical to the size of LU A. Thus for LU A, storage system 546 serves as a backup for source side storage system 536. Alternatively, as mentioned hereinabove, some logical units of storage system 546 may be used to back up logical units of storage system 536, and other logical units of storage system 546 may be used for other purposes. Moreover, in certain embodiments, there is symmetric replication whereby some logical units of storage system 536 are used for replicating logical units of storage system 546, and other logical units of storage system 546 are used for replicating other logical units of storage system 536.

System 500 includes a source side host computer 532 and a target side host computer 542. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment, host device 532 identifies LU A and generates a corresponding host device (e.g., device A), through which it can access LU A. Similarly, host computer 542 identifies LU B and generates a corresponding device (e.g., device B).

In an embodiment, in the course of continuous operation, host computer 532 is a SAN initiator that issues I/O requests (write/read operations) through host device A to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 532 may be, for example, 10 kilobytes (KB); i.e., 20 blocks. For an I/O rate of 50 megabytes (MB) per second, this corresponds to approximately 5,000 write transactions per second.

System 500 includes two replication appliances. A replication appliance may be referred to as a data protection appliance. There is a source side replication appliance 539 and a target side replication appliance 549. A replication appliance performs various data protection services, such as data replication of a storage system, and journaling of I/O requests issued by a host computer to source side storage system data. As explained in detail herein below, when acting as a target side replication appliance, a replication appliance may also enable rollback of data to an earlier point in time, and processing of rolled back data at the target site. Each replication appliance 539 and 549 is a computer that includes among other things one or more conventional CPUs and internal memory.

For additional safety precaution, each replication appliance may include a cluster of such computers. Use of a cluster ensures that if a replication computer is down, then the replication functionality switches over to another computer. The replication appliance computers within a replication appliance cluster communicate with one another using at least one communication link suitable for data transfer via fiber channel or IP based protocols, or such other transfer protocol. One computer from the replication appliance cluster serves as the replication appliance leader. The replication appliance cluster leader coordinates between the computers in the cluster, and may also perform other tasks that require coordination between the computers, such as load balancing.

In the architecture illustrated in FIG. 5, the replication appliances are standalone devices integrated within a SAN. Alternatively, each of replication appliance 539 and replication appliance 549 may be integrated into storage system 536 and storage system 546, respectively, or integrated into host computer 532 and host computer 542, respectively.

Both replication appliances communicate with their respective host computers through communication lines such as fiber channels using, for example, SCSI commands.

In accordance with an embodiment, the replication appliances are configured to act as initiators in the SAN; i.e., they can issue I/O requests using, for example, SCSI commands, to access logical units on their respective storage systems. The replication appliances are also configured with the necessary functionality to act as targets; i.e., to reply to I/O requests, such as SCSI commands, issued by other initiators in the SAN, including among other things their respective host computers 532 and 542. Being target nodes, the replication appliances may dynamically expose or remove one or more logical units.

As described hereinabove, Site I and Site II may each behave simultaneously as a production site and a replica site for different logical units. As such, the replication appliances may each behave as a source replication appliance for some logical units and as a target replication appliance for other logical units, at the same time.

In a specific embodiment, the source storage system includes a splitter 553 with policy enforcement services. In another specific embodiment, a splitter with policy enforcement services may be located within the hypervisor or other virtualization layer. Although not shown, target storage system 546, host computer 542, or both may likewise include a splitter with (or without) policy enforcement services 503.

A splitter intercepts SCSI commands issued by their respective host computers, via host devices to logical units that are accessible to the host computers. A splitter may act on an intercepted SCSI commands issued to a logical unit, in one of the following ways:

1) Send the SCSI commands to its intended logical unit.
2) Redirect the SCSI command to another logical unit.
3) Split the SCSI command by sending it first to the respective replication appliance. After the replication appliance returns an acknowledgement, send the SCSI command to its intended logical unit.
4) Fail a SCSI command by returning an error return code.
5) Delay a SCSI command by not returning an acknowledgement to the respective host computer.

A splitter may handle different SCSI commands, differently, according to the type of the command. For example, a SCSI command inquiring about the size of a certain logical unit may be sent directly to that logical unit, while a SCSI write command may be split and sent first to a replication appliance associated with the splitter. A splitter may also change its behavior for handling SCSI commands, for example as a result of an instruction received from the replication appliance.

Specifically, the behavior of a splitter for a certain host device generally corresponds to the behavior of its associated replication appliance with respect to the logical unit of the host device. When a replication appliance behaves as a source site replication appliance for a certain logical unit, then during normal course of operation, the associated splitter splits I/O requests issued by a host computer to the host device corresponding to that logical unit. Similarly, when a replication appliance behaves as a target device for a certain logical unit, then during normal course of operation, the associated splitter fails I/O requests issued by host computer to the host device corresponding to that logical unit.

Communication between splitters and their respective replication appliances may use any protocol suitable for data transfer within a SAN, such as fiber channel, or SCSI over fiber channel. The communication may be direct, or via a logical unit exposed by the replication appliance. In an embodiment, splitters communicate with their respective replication appliances by sending SCSI commands over fiber channel.

In a specific embodiment, the splitter with policy enforcement services 553/503 is located in the source storage system. In another specific embodiment, the splitter with policy enforcement services may be located in a hypervisor 506. The splitter, however, may be located in a fiber channel switch or in any other device situated in a data path between the host and storage system.

In an embodiment, in production mode replication appliance 539 acts as a source site replication appliance for LU A. Thus, splitter 553 is configured to act as a source side splitter; i.e., as a splitter for host device A. Specifically, splitter 553 replicates SCSI I/O requests. A replicated SCSI I/O request is sent to replication appliance 549. After receiving an acknowledgement from replication appliance 549, splitter 553 then sends the SCSI I/O request to LU A. Only after receiving a second acknowledgement from storage system 536 may host computer 532 initiate another I/O request.

When replication appliance 539 receives a replicated SCSI write request from splitter 553, replication appliance 539 transmits certain I/O information characterizing the write request, packaged as a "write transaction", over WAN 528 to replication appliance 549 on the target side, for journaling and for incorporation within target storage system 546.

Replication appliance 539 may send its write transactions to replication appliance 549 using a variety of modes of transmission, including inter alia (i) a synchronous mode, (ii) an asynchronous mode, and (iii) a snapshot mode. In synchronous mode, replication appliance 539 sends each write transaction to replication appliance 549, receives back an acknowledgement from replication appliance 549, and in turns sends an acknowledgement back to splitter 553. Splitter 553 waits until receipt of such acknowledgement before sending the SCSI write request to LU A.

In asynchronous mode, replication appliance 539 sends an acknowledgement to splitter 553 upon receipt of each I/O request, before receiving an acknowledgement back from replication appliance 549.

In snapshot mode, replication appliance 539 receives several I/O requests and combines them into an aggregate "snapshot" of all write activity performed in the multiple I/O requests, and sends the snapshot to replication appliance 549, for journaling and for incorporation in target storage system 546. In snapshot mode replication appliance 539 also sends an acknowledgement to splitter 553 upon receipt of each I/O request, before receiving an acknowledgement back from replication appliance 549.

For the sake of clarity, the ensuing discussion assumes that information is transmitted at write-by-write granularity.

While in production mode, replication appliance 549 receives replicated data of LU A from replication appliance 539, and performs journaling and writing to storage system 546. When applying write operations to storage system 546, replication appliance 549 acts as an initiator, and sends SCSI commands to LU B.

During a recovery mode, replication appliance 549 undoes the write transactions in the journal, so as to restore storage system 546 to the state it was at, at an earlier time. A replica VM 561 may be created, on-demand and hosted by host computer 542, to access the VM backup disk.

As described hereinabove, in an embodiment, LU B is used as a backup of LU A. As such, during normal production mode, while data written to LU A by host computer 532 is replicated from LU A to LU B, host computer 542 should not be sending I/O requests to LU B. To prevent such I/O requests from being sent, a splitter at the target or replica site acts as a target site protection agent for host device B and fails I/O requests sent from host computer 542 to LU B through host device B.

In an embodiment, target storage system 546 exposes a logical unit, referred to as a IO journal 559, for maintaining a history of write transactions made to LU B. Alternatively, IO journal 559 may be striped over several logical units, or may reside within all of or a portion of another logical unit. Replication appliance 549 includes a journal processor 562 for managing the journal.

Journal processor 562 functions generally to manage the journal entries of LU B. Specifically, journal processor 562 (i) enters write transactions received by replication appliance 549 from replication appliance 539 into the journal, by writing them into the journal LU, (ii) applies the journal transactions to LU B, and (iii) updates the journal entries in the journal LU with undo information and removes already-applied transactions from the journal.

As shown in the example of FIG. 5, in a specific embodiment, policy enforcement services reside in a layer below the operating system of the device (e.g., below the guest OS of the virtual machine). The layer at which the policy enforcement services reside may be referred to as the storage virtualization layer. As discussed, in another specific embodiment, the policy enforcement services are integrated with the splitter in the hypervisor or other storage virtualization layer. The splitter, when installed in the hypervisor, may not necessarily have access to the production data store and so may be unable to scan entire files on the production data store, however, the splitter has access to changes because it is situated in a path of an IO stream 562. The IO stream may include an IO (e.g., write operation) issued by the guest application to the guest OS which in turn passes the IO further down the protocol stack to the hypervisor where the IO is scanned by the splitter. The policy enforcement services of the splitter can constantly scan the IO stream for potential policy infringements.

Because the splitter with policy enforcement services resides below the OS layer of the virtual machine, it is much more difficult to bypass the enforcement services. For example, consider that the virtual machine has an agent-level enforcer that prevents a user of the virtual machine from installing a banned application. As a result, the user decides to create an unauthorized VM—without the agent-level enforcer—in order to install and run the banned application. IOs from the banned application, however, will be scanned by the splitter because the splitter (with policy enforcement services) resides in a layer below the guest OS layers of the VMs.

The architecture shown in FIG. 5 may be referred to as continuous replication. In an embodiment, continuous replication includes continuously copying in real-time or near real-time each IO. In another specific embodiment, storage layer policy enforcement services may be implemented in a snapshot-based replication architecture where a snapshot is periodically created throughout the day (e.g., every 10 minutes) and data copied from the snapshot to a remote location. A storage layer policy enforcement service may be configured to scan the data before the data is coped to the remote location. For example, the scanning may occur in conjunction with the copying. Alternatively, the data may be scanned at the remote location after the copying. Alternatively, the data may be scanned in real-time such as after an IO is issued from the OS layer of the device and before the IO is received at a production data store (e.g., before the IO is written to persistent storage).

In a specific embodiment, policy enforcement services may be implemented within a product referred to as "RecoverPoint for Virtual Machines" (RP4VMs), as provided by Dell EMC. In a virtualization environment, RP4VMs is storage-agnostic. In this specific embodiment, a "datastore" can be a logical entity that holds virtual machine information and data disks. The datastore can reside on physical storage arrays (e.g., one or more LUs), on file systems like NAS, in a distributed software-defined-storage, and so forth. Inside the datastore resides the VM's disk.

Figure 6:
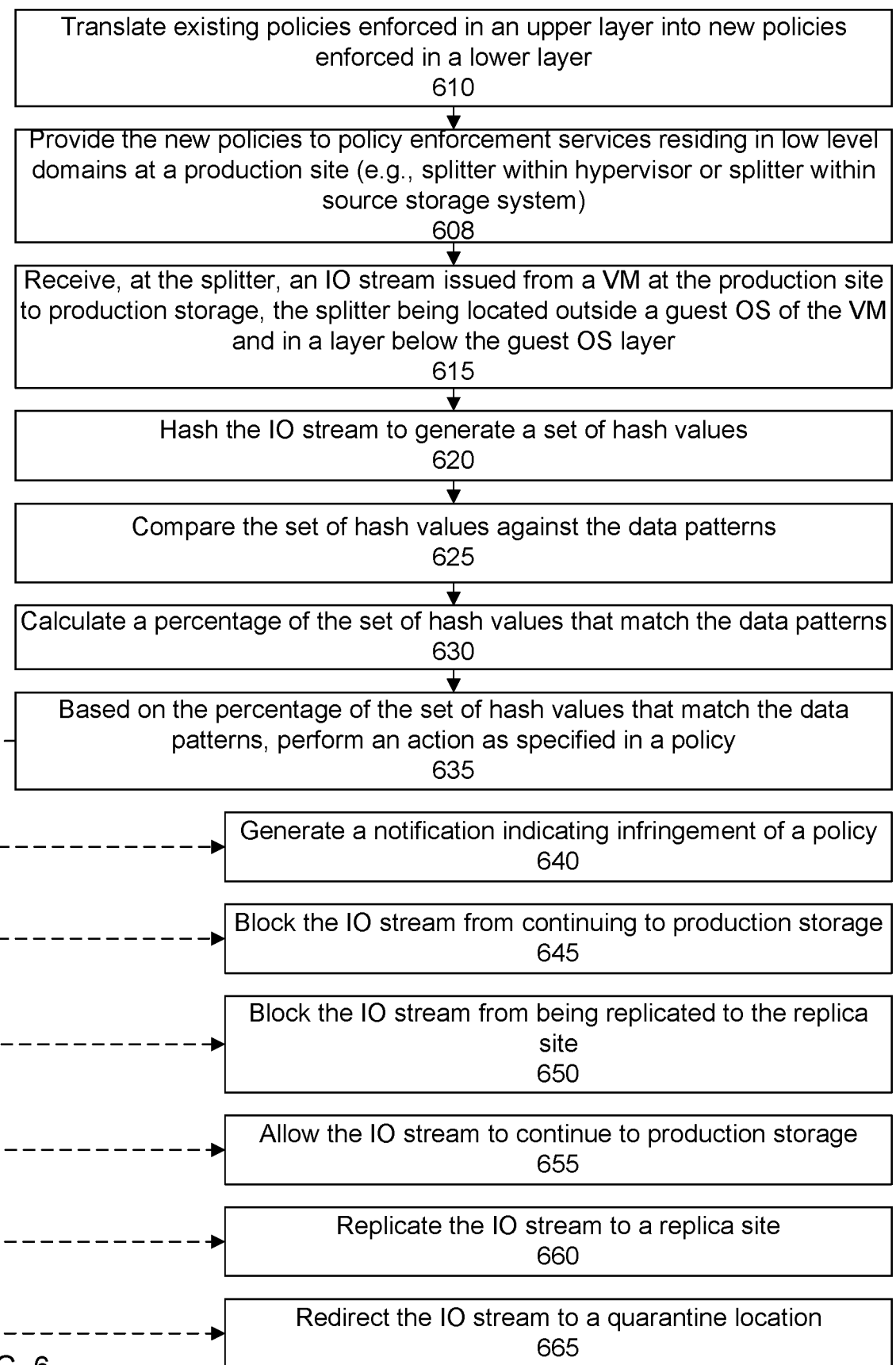
FIG. 6 shows a flow of a replication system having storage layer policy enforcement services, according to one or more embodiments.

FIG. 6 shows an overall flow of policy enforcement services being implemented in a virtual storage domain (e.g., hypervisor) of a data protection or replication system. In a step 610, existing policies that are enforced in an upper layer are translated into new policies, consistent with the existing policies, to be enforced in a lower layer. The new policies may specify data patterns associated with malware. The data patterns may be stored in a data pattern database accessible to policy enforcement services operating at a low level.

In a step 608, the new policies are provided to policy enforcement services residing in low level domains at a production site (e.g., splitter within a hypervisor, or splitter within source storage system).

In a step 615, an IO stream issued from the VM at the production site to production storage is received at the splitter, the splitter being located outside a guest OS of the VM and in a layer below the guest OS layer.

In a step 620, the splitter hashes the IO stream to generate a set of hash values. In a step 625, the hash values are compared against the data patterns stored in the data pattern database. In a step 630, a percentage of the set of hash values that match the data patterns is calculated. In a step 635, based on the percentage of the set of hash values that match the data patterns, an action is performed as specified in the policy.

Figure 7:
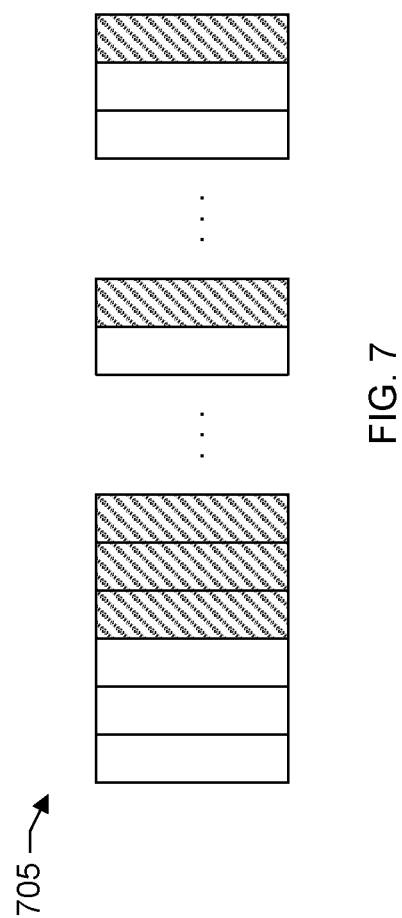
FIG. 7 shows an example of hashed file blocks, according to one or more embodiments.

More particularly, FIG. 7 shows a set of blocks 705 that may be present in an IO stream and received by the splitter. The blocks may be portions of a file that has been chunked or divided into smaller portions (i.e., blocks). A hash is calculated for each block to obtain a hash value. Consider, for example, that blocks shown with a fill pattern of slanted lines have hash values corresponding to a blacklisted or banned file according to the security policy.

A count of the blocks scanned or examined over a rolling time period may be maintained and a determination may be made as to the percentage of blocks whose hash values correspond to blacklisted files. If the percentage exceeds a configurable threshold percentage (that be defined in the policy) an action may be taken such as an alert notification generated.

Basing the trigger for action on a percentage helps to protect against false positives and disruptions to business operations. For example, if only 1 or 2 blocks out of 2,000 blocks have hash values matching hash values of a blacklisted file, then it may be unlikely that the corresponding file is the blacklisted file. If, however, 600 or more blocks out of 2,000 blocks have hash values matching the hash values of the blacklisted file, then it is more likely that the corresponding file is indeed the blacklisted file.

Referring back now to FIG. 6, when a policy violation or infringement has been detected (e.g., a condition in a policy has (or has not) been satisfied), one or more actions may be performed according to the policy. The actions may include one or more of generating and logging a notification indicating infringement of a policy (step 640), blocking the IO stream from continuing to production storage (step 645), blocking the IO stream from being replicated to the replica site (650), allowing the IO stream to continue to production storage (step 655), allowing the IO stream to be replicated to the replica site (step 660), redirecting the IO stream to a quarantine location (step 665), or combinations of these.

As discussed, an action may be performed in combination with another action according to policy. For example, depending upon the type of violation or level of risk exposure, an organization may configure a particular policy such that when a violation is detected, a notification alert is generated, such as for an IT administrator to review (step 640), but the IO is allowed to continue to the production data store (e.g., splitter sends IO to its intended logical unit) (step 655). Such actions may be desirable where, for example, a relatively benign blacklisted application is detected and the organization does not wish to interfere with or stop transactions at the production site. In these cases, the IO may also be allowed to be replicated to the replica site (step 660).

As another example, the splitter may send the IO to its intended logical unit at the production site, but instead of replicating the IO to the replica site, the splitter may instead redirect the IO to a quarantine server (or a logical unit designated as being a quarantine area). In other words, instead of the splitter sending the IO to the source side replication appliance for replication to the replica site, the splitter may send the IO to the quarantine server. Upon receipt of the IO by the quarantine server, the quarantine server may send an acknowledgement to the splitter. Upon receipt of the acknowledgement by the splitter, the splitter may send the IO to its intended logical unit at the production site. This allows potentially suspicious or unusual activity to be monitored without interfering with production operations and limiting the risk exposure of the replica site. If the activity is eventually deemed safe (e.g., a false alarm), the activity redirected to the quarantine location may be merged back to the replica site so that the production and replica sites are in sync. If the number of false alarms becomes too frequent, the organization may adjust the sensitivity of the policy enforcement services by, for example, raising the threshold percentage for matching hashes to malware data patterns.

As another example, the splitter may block the IO operation (e.g., block access to a file residing on production storage) (step 645) in conjunction with generating the notification (step 640). For example, an IO request to access a confidential file may be received by the splitter and examined. If the user is not authorized to access the confidential file, the splitter may fail the IO and return an error.

Thus, the replication system with low-level policy enforcement services provides a great deal of flexibility for an organization to tailor and customize to their own particular preferences. The organization may tune policy enforcement sensitivity by adjusting the threshold percentage for matching hashes to malware data patterns, strike the appropriate balance between risk exposure and production efficiency, decide for themselves which applications to ban and which applications to allow, and so forth.

The systems and techniques described herein allow for implementing security policy enforcement in the storage layer infrastructure of a data center. Policy enforcement at the storage layer is much more difficult to bypass as compared to enforcer agents running on the various devices (e.g., computers, servers, and so forth). In other words, policy enforcement is provided below the OS layer of the device such as, for example, at the storage virtualization layer, in backup or replication hardware, and so forth.

Further, while FIG. 5 shows policy enforcement services being provided in a splitter residing in the source storage system at the production site, it should be appreciated that policy enforcement services may instead or additionally provided elsewhere below the OS layer of the device (e.g., in a hypervisor or other virtualization layer at the production site). In another specific embodiment, policy enforcement services are provided at the replica or backup site. In this specific embodiment, the policy enforcement services may examine and check backup copies at the replica site.

In a specific embodiment, a holistic approach is provided whereby the existing or original security policies of an organization are translated into new policies, consistent with the existing or original security policies, that are enforceable at the storage layer infrastructure. Policy enforcement can be used to check or verify, for example, a specific user login, applications that are allowed to run, applications that are not allowed to run, websites that are allowed to be accessed, websites that are not allowed to be accessed, transfers of files to particular devices, access to specific files, changes to specific files, changes to specific directories, time of change, and the like.

Figure 8:
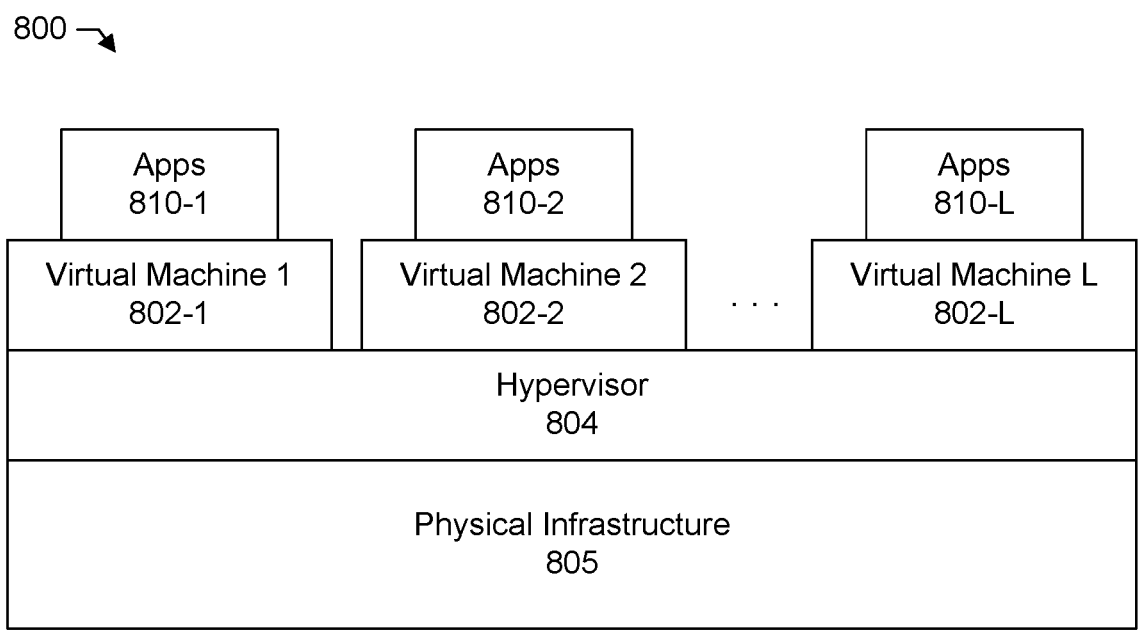
FIG. 8 shows a block diagram of a processing platform that may be utilized to implement at least a portion of an information processing system, according to one or more embodiments.

FIG. 8 shows an example of an information processing platform comprising cloud infrastructure 800 in which policy translation and storage layer policy enforcement services may be used. The cloud infrastructure 800 comprises a combination of physical and virtual processing resources that may be utilized to implement at least a portion of policy translation and storage layer policy enforcement services. The cloud infrastructure 800 comprises virtual machines (VMs) 802-1, 802-2, . . . 802-L implemented using a hypervisor 804. The hypervisor runs on physical infrastructure 805. The cloud infrastructure 800 further comprises sets of applications 810-1, 810-2, . . . 810-L running on respective ones of the virtual machines 802-1, 802-2, . . . 802-L under the control of the hypervisor.

Although only a single hypervisor is shown in the embodiment of FIG. 8, the system may include multiple hypervisors each providing a set of virtual machines using at least one underlying physical machine. Different sets of virtual machines provided by one or more hypervisors may be utilized in configuring multiple instances of various components of the system.

An example of a commercially available hypervisor platform that may be used to implement the hypervisor and possibly other portions of the information processing system in one or more embodiments is the VMware® vSphere® which may have an associated virtual infrastructure management system such as the VMware® vCenter™. The underlying physical machines may comprise one or more distributed processing platforms that include one or more storage systems.

Figure 9:
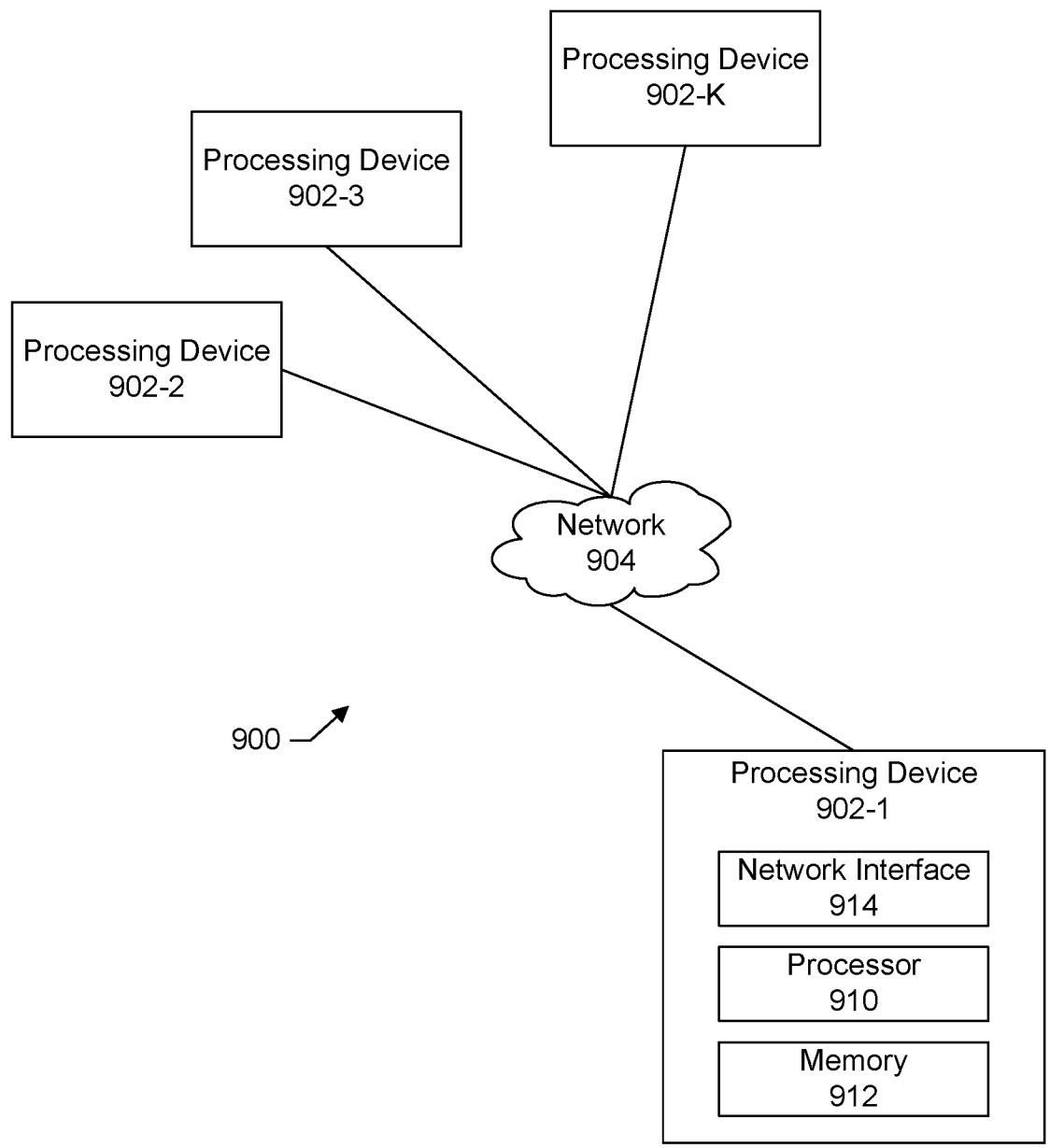
FIG. 9 shows another block diagram of a processing platform that may be utilized to implement at least a portion of an information processing system, according to one or more embodiments.

As is apparent from the above, one or more of the processing modules or other components of the system may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of system for translating policies and policy enforcement at the storage layer and includes a plurality of processing devices, denoted 902-1, 902-2, 902-3, . . . 902-K, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 902-1 in the processing platform 900 comprises a processor 910 coupled to a memory 912.

The processor 910 may comprise a microprocessor, a microcontroller, an application-specific integrated circuit (ASIC), a field-programmable gate array (FPGA) or other type of processing circuitry, as well as portions or combinations of such circuitry elements.

The memory 912 may comprise random access memory (RAM), read-only memory (ROM) or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and a system for translating policies and enforcing at the storage layer may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform are illustratively implemented in the form of software running on one or more processing devices.

Figure 10:
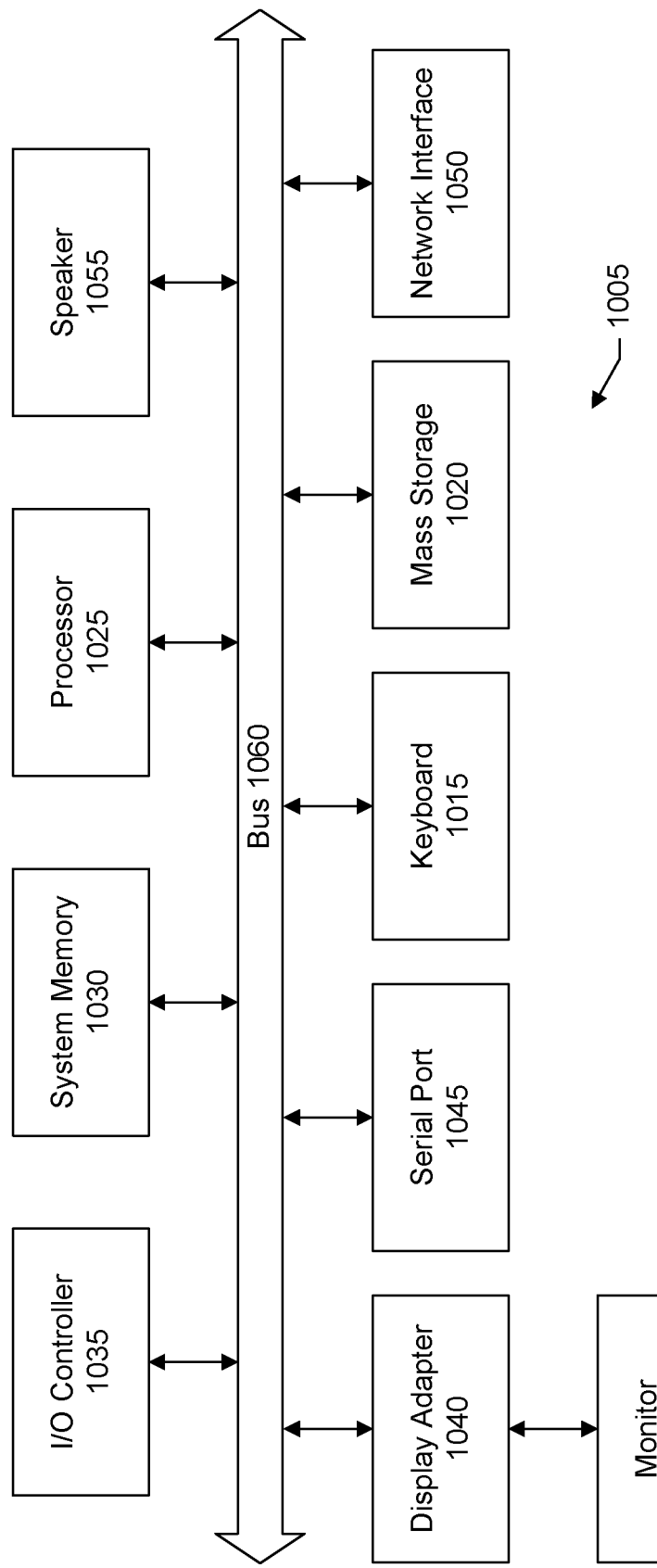
FIG. 10 shows a block diagram of a computer system suitable for use with the system, according to one or more embodiments.

FIG. 10 shows a system block diagram of a computer system 1005 used to execute the software of the present system described herein. The computer system includes a monitor 1007, keyboard 1015, and mass storage devices 1020. Computer system 1005 further includes subsystems such as central processor 1025, system memory 1030, input/output (I/O) controller 1035, display adapter 1040, serial or universal serial bus (USB) port 1045, network interface 1050, and speaker 1055. The system may also be used with computer systems with additional or fewer subsystems. For example, a computer system could include more than one processor 1025 (i.e., a multiprocessor system) or a system may include a cache memory.

Arrows such as 1060 represent the system bus architecture of computer system 1005. However, these arrows are illustrative of any interconnection scheme serving to link the subsystems. For example, speaker 1055 could be connected to the other subsystems through a port or have an internal direct connection to central processor 1025. The processor may include multiple processors or a multicore processor, which may permit parallel processing of information. Computer system 1005 shown in FIG. 10 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers. The variable N and other similar index variables are assumed to be arbitrary positive integers greater than or equal to two.

In a specific embodiment, there is a system comprising: a processor; and memory configured to store one or more sequences of instructions which, when executed by the processor, cause the processor to carry out the steps of: obtaining a plurality of existing policies that are enforced at or above an operating system (OS) layer of a device; storing a plurality of translation rules comprising data structure descriptions of conditions, corresponding actions performed when the conditions are satisfied, and attributes specified in the existing policies, and attributes of one or more layers below the OS layer that are relevant to policy enforcement in the one or more layers below the OS layer; parsing, using the data structure descriptions, the plurality of existing policies to identify the conditions, corresponding actions, and attributes specified in the existing policies; generating a plurality of new policies consistent with the plurality of existing policies, the new policies comprising the identified attributes specified in the existing policies, and the attributes relevant to policy enforcement in the one or more layers below the OS layer; and enforcing the new policies in the one or more layers below the OS layer of the device, wherein the OS layer is above an infrastructure-as-a-service (IaaS) layer, and the one or more layers below the OS layer are within the IaaS layer.

In an embodiment, the plurality of existing policies are specified at a first level of abstraction and the processor further carries out the step of specifying the plurality of new policies at a second level of abstraction, lower than the first level of abstraction.

In an embodiment, the processor further carries out the steps of: obtaining a first existing policy that is enforced at or above the OS layer; generating first and second new policies, each of the first and second new policies being based on and consistent with the first existing policy; enforcing the first new policy in a first backend component, the first backend component being in the one or more layers below the OS layer; and enforcing the second new policy in a second backend component, different from the first backend component, the second backend component being in the one or more layers below the OS layer.

In an embodiment, the processor further carries out the steps of: obtaining a first existing policy that is enforced at or above the OS layer; parsing the first existing policy to identify an attribute corresponding to a time period, and a condition having a corresponding action indicating that updates to system files are allowed only during the time period; and generating a first new policy consistent with the first existing policy, the first new policy to be enforced in a file system of a network attached storage (NAS), and comprising a first new condition having a first new corresponding action indicating that write operations to a particular directory of the NAS outside the time period are to be blocked, wherein the particular directory stores system files.

In an embodiment, the processor further carries out the steps of: obtaining a first existing policy that is enforced at or above the OS layer; parsing the first existing policy to identify an attribute corresponding to a time period, and a condition having a corresponding action indicating that updates to system files are allowed only during the time period; and generating a first new policy consistent with the first existing policy, the first new policy to be enforced in a networking component, and comprising a first new condition having a first new corresponding action indicating that traffic to a specific firewall port number outside the time period is to be blocked, wherein the specific firewall port number is used to update the system files.

In an embodiment, the processor further carries out the steps of: obtaining a first existing policy that is enforced at or above the OS layer; parsing the first existing policy to identify an attribute corresponding to a file, and a condition having a corresponding action indicating that the file is to be quarantined, the file thereby being malware; and generating a first new policy consistent with the first existing policy, the first new policy to be enforced in a block storage component, and comprising a first new condition having a first new corresponding action indicating that an alert is to be issued when matches between hashes of consecutive data sequences of data sent to the block storage component and hashes associated with the file exceed a threshold percentage.

In an embodiment, the processor further carries out the steps of: obtaining a first existing policy that is enforced at or above the OS layer; parsing the first existing policy to identify an attribute corresponding to a file, and a condition having a corresponding action indicating that the file is to be quarantined, the file thereby being malware; and generating a first new policy consistent with the first existing policy, the first new policy to be enforced in a networking component, and comprising a first new condition having a first new corresponding action indicating that an alert is to be issued when matches between hashes of packet payloads in traffic to a connection of the network component and hashes associated with the file exceed a threshold percentage.

In another specific embodiment, there is a method comprising: obtaining a plurality of existing policies that are enforced at or above an operating system (OS) layer of a device; storing a plurality of translation rules comprising data structure descriptions of conditions, corresponding actions performed when the conditions are satisfied, and attributes specified in the existing policies, and attributes of one or more layers below the OS layer that are relevant to policy enforcement in the one or more layers below the OS layer; parsing, using the data structure descriptions, the plurality of existing policies to identify the conditions, corresponding actions, and attributes specified in the existing policies; generating a plurality of new policies consistent with the plurality of existing policies, the new policies comprising the identified attributes specified in the existing policies, and the attributes relevant to policy enforcement in the one or more layers below the OS layer; and enforcing the new policies in the one or more layers below the OS layer of the device, wherein the OS layer is further from a physical layer as specified by an Open System Interconnect (OSI) model than the one or more layers below the OS layer.

In another specific embodiment, there is a computer program product, comprising a non-transitory computer-readable medium having a computer-readable program code embodied therein, the computer-readable program code adapted to be executed by one or more processors to implement a method comprising: obtaining a plurality of existing policies that are enforced at or above an operating system (OS) layer of a device; storing a plurality of translation rules comprising data structure descriptions of conditions, corresponding actions performed when the conditions are satisfied, and attributes specified in the existing policies, and attributes of one or more layers below the OS layer that are relevant to policy enforcement in the one or more layers below the OS layer; parsing, using the data structure descriptions, the plurality of existing policies to identify the conditions, corresponding actions, and attributes specified in the existing policies; generating a plurality of new policies consistent with the plurality of existing policies, the new policies comprising the identified attributes specified in the existing policies, and the attributes relevant to policy enforcement in the one or more layers below the OS layer; and enforcing the new policies in the one or more layers below the OS layer of the device wherein the OS layer is further from a physical layer as specified by an Open System Interconnect (OSI) model than the one or more layers below the OS layer.

A method may include: obtaining a first existing policy that is enforced at or above the OS layer; parsing the first existing policy to identify an attribute corresponding to a file, and a condition having a corresponding action indicating that the file is to be quarantined, the file thereby being malware; generating a first new policy consistent with the first existing policy, the first new policy to be enforced in a block storage component, and comprising a first new condition having a first new corresponding action indicating that an alert is to be issued when matches between hashes of consecutive data sequences of data sent to the block storage component and hashes associated with the file exceed a threshold percentage; and generating a second new policy consistent with the first existing policy, the second new policy to be enforced in a networking component, and comprising a second new condition having a second new corresponding action indicating that an alert is to be issued when matches between hashes of packet payloads in traffic to a connection of the network component and hashes associated with the file exceed the threshold percentage.

In a specific embodiment, a method may include: obtaining a plurality of existing policies that are enforced at or above an operating system (OS) layer of a device; storing a plurality of translation rules comprising data structure descriptions of conditions and attributes specified in the plurality of existing policies, and attributes of one or more layers below the OS layer that are relevant to policy enforcement in the one or more layers below the OS layer; parsing, using the data structure descriptions, the plurality of existing policies to identify the conditions and attributes specified in the plurality of existing policies; generating new policies comprising new conditions consistent with the identified conditions in the plurality of existing policies, wherein the new conditions comprise the identified attributes specified in the plurality of existing policies, and the attributes relevant to policy enforcement in the one or more layers below the OS layer; and In a specific embodiment, a method may include: storing a set of translation rules for translating existing policies to new policies, wherein the translation rules comprise operations that occur in low-level domains, the existing policies are enforced at or above an operating system (OS) layer of a device, and the new policies are to be enforced at the low-level domains, the low-level domains being in one or more layers below the OS layer of the device; generating, according to a first translation rule, a first new policy from a first existing policy, the generating comprising: parsing the first existing policy to deduce a first condition specified in the first existing policy; creating a second condition comprising a first operation that occurs in a first low-level domain; and inserting a derivation of the first condition, the second condition, and an action to perform when the derivation of the first condition and the second condition are satisfied into the first new policy; and enforcing the first new policy at the first low-level domain.

In a specific embodiment, a method may include: storing security policies, defined by a user of an organization, to protect the organization from malware, the security policies being associated with data patterns of hash values, and comprising one or more actions to perform based on matches to the data patterns; receiving, at a splitter, an input/output (IO) stream from a device to a production storage system, the IO stream to be replicated to a replica storage system, and the splitter being located outside an operating system (OS) layer of the device and in a layer below the OS layer; hashing the IO stream to generate a plurality of hash values; comparing the plurality of hash values against the data patterns; calculating a percentage of the plurality of hash values that match the data patterns; and based on the percentage of the plurality of hash values that match the data patterns, performing an action as specified in a security policy.

In another specific embodiment, there is a system comprising: a processor; and memory configured to store one or more sequences of instructions which, when executed by the processor, cause the processor to carry out the steps of: obtaining a plurality of existing policies that are enforced at or above an operating system (OS) layer of a device; storing a plurality of translation rules comprising data structure descriptions of conditions, corresponding actions performed when the conditions are satisfied, and attributes specified in the existing policies, and attributes of one or more layers below the OS layer that are relevant to policy enforcement in the one or more layers below the OS layer; parsing, using the data structure descriptions, the plurality of existing policies to identify the conditions, corresponding actions, and attributes specified in the existing policies; generating a plurality of new policies consistent with the plurality of existing policies, the new policies comprising the identified attributes specified in the existing policies, and the attributes relevant to policy enforcement in the one or more layers below the OS layer; and enforcing the new policies in the one or more layers below the OS layer of the device, wherein the OS layer is further from a physical layer as specified by an Open System Interconnect (OSI) model than the one or more layers below the OS layer.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A system comprising: a processor; and memory configured to store one or more sequences of instructions which, when executed by the processor, cause the processor to carry out the steps of:
obtaining a plurality of existing policies that are enforced at or above an operating system (OS) layer of a device;
storing a plurality of translation rules comprising data structure descriptions of conditions, corresponding actions performed when the conditions are satisfied, and attributes specified in the existing policies, and attributes of one or more layers below the OS layer that are relevant to policy enforcement in the one or more layers below the OS layer;
parsing, using the data structure descriptions, the plurality of existing policies to identify the conditions, corresponding actions, and attributes specified in the existing policies;
generating a plurality of new policies consistent with the plurality of existing policies, the new policies comprising the identified attributes specified in the existing policies, and the attributes relevant to policy enforcement in the one or more layers below the OS layer; and
enforcing the new policies in the one or more layers below the OS layer of the device, wherein the OS layer is above an infrastructure-as-a-service (IaaS) layer, and the one or more layers below the OS layer are within the IaaS layer.

2. The system of claim 1 wherein the plurality of existing policies are specified at a first level of abstraction and the processor further carries out the step of specifying the plurality of new policies at a second level of abstraction, lower than the first level of abstraction.

3. The system of claim 1 wherein the processor further carries out the steps of:
obtaining a first existing policy that is enforced at or above the OS layer;
generating first and second new policies, each of the first and second new policies being based on and consistent with the first existing policy;
enforcing the first new policy in a first backend component, the first backend component being in the one or more layers below the OS layer; and
enforcing the second new policy in a second backend component, different from the first backend component, the second backend component being in the one or more layers below the OS layer.

4. The system of claim 1 wherein the processor further carries out the steps of:
obtaining a first existing policy that is enforced at or above the OS layer;
parsing the first existing policy to identify an attribute corresponding to a time period, and a condition having a corresponding action indicating that updates to system files are allowed only during the time period; and
generating a first new policy consistent with the first existing policy, the first new policy to be enforced in a file system of a network attached storage (NAS), and comprising a first new condition having a first new corresponding action indicating that write operations to a particular directory of the NAS outside the time period are to be blocked, wherein the particular directory stores system files.

5. The system of claim 1 wherein the processor further carries out the steps of:
obtaining a first existing policy that is enforced at or above the OS layer;
parsing the first existing policy to identify an attribute corresponding to a time period, and a condition having a corresponding action indicating that updates to system files are allowed only during the time period; and
generating a first new policy consistent with the first existing policy, the first new policy to be enforced in a networking component, and comprising a first new condition having a first new corresponding action indicating that traffic to a specific firewall port number outside the time period is to be blocked, wherein the specific firewall port number is used to update the system files.

6. The system of claim 1 wherein the processor further carries out the steps of:
obtaining a first existing policy that is enforced at or above the OS layer;
parsing the first existing policy to identify an attribute corresponding to a file, and a condition having a corresponding action indicating that the file is to be quarantined, the file thereby being malware; and
generating a first new policy consistent with the first existing policy, the first new policy to be enforced in a block storage component, and comprising a first new condition having a first new corresponding action indicating that an alert is to be issued when matches between hashes of consecutive data sequences of data sent to the block storage component and hashes associated with the file exceed a threshold percentage.

7. The system of claim 1 wherein the processor further carries out the steps of:
obtaining a first existing policy that is enforced at or above the OS layer;
parsing the first existing policy to identify an attribute corresponding to a file, and a condition having a corresponding action indicating that the file is to be quarantined, the file thereby being malware; and
generating a first new policy consistent with the first existing policy, the first new policy to be enforced in a networking component, and comprising a first new condition having a first new corresponding action indicating that an alert is to be issued when matches between hashes of packet payloads in traffic to a connection of the network component and hashes associated with the file exceed a threshold percentage.

8. A method comprising:
obtaining a plurality of existing policies that are enforced at or above an operating system (OS) layer of a device;
storing a plurality of translation rules comprising data structure descriptions of conditions, corresponding actions performed when the conditions are satisfied, and attributes specified in the existing policies, and attributes of one or more layers below the OS layer that are relevant to policy enforcement in the one or more layers below the OS layer;
parsing, using the data structure descriptions, the plurality of existing policies to identify the conditions, corresponding actions, and attributes specified in the existing policies;
generating a plurality of new policies consistent with the plurality of existing policies, the new policies comprising the identified attributes specified in the existing policies, and the attributes relevant to policy enforcement in the one or more layers below the OS layer; and
enforcing the new policies in the one or more layers below the OS layer of the device, wherein the OS layer is above an infrastructure-as-a-service (IaaS) layer, and the one or more layers below the OS layer are within the IaaS layer.

9. The method of claim 8 wherein the plurality of existing policies are specified at a first level of abstraction and the method comprises specifying the plurality of new policies at a second level of abstraction, lower than the first level of abstraction.

10. The method of claim 8 comprising:
obtaining a first existing policy that is enforced at or above the OS layer;
generating first and second new policies, each of the first and second new policies being based on and consistent with the first existing policy;
enforcing the first new policy in a first backend component, the first backend component being in the one or more layers below the OS layer; and
enforcing the second new policy in a second backend component, different from the first backend component, the second backend component being in the one or more layers below the OS layer.

11. The method of claim 8 comprising:
obtaining a first existing policy that is enforced at or above the OS layer;
parsing the first existing policy to identify an attribute corresponding to a time period, and a condition having a corresponding action indicating that updates to system files are allowed only during the time period; and
generating a first new policy consistent with the first existing policy, the first new policy to be enforced in a file system of a network attached storage (NAS), and comprising a first new condition having a first new corresponding action indicating that write operations to a particular directory of the NAS outside the time period are to be blocked, wherein the particular directory stores system files.

12. The method of claim 8 comprising:
obtaining a first existing policy that is enforced at or above the OS layer;
parsing the first existing policy to identify an attribute corresponding to a time period, and a condition having a corresponding action indicating that updates to system files are allowed only during the time period; and
generating a first new policy consistent with the first existing policy, the first new policy to be enforced in a networking component, and comprising a first new condition having a first new corresponding action indicating that traffic to a specific firewall port number outside the time period is to be blocked, wherein the specific firewall port number is used to update the system files.

13. The method of claim 8 comprising:
obtaining a first existing policy that is enforced at or above the OS layer;
parsing the first existing policy to identify an attribute corresponding to a file, and a condition having a corresponding action indicating that the file is to be quarantined, the file thereby being malware; and
generating a first new policy consistent with the first existing policy, the first new policy to be enforced in a block storage component, and comprising a first new condition having a first new corresponding action indicating that an alert is to be issued when matches between hashes of consecutive data sequences of data sent to the block storage component and hashes associated with the file exceed a threshold percentage.

14. The method of claim 8 comprising:
obtaining a first existing policy that is enforced at or above the OS layer;
parsing the first existing policy to identify an attribute corresponding to a file, and a condition having a corresponding action indicating that the file is to be quarantined, the file thereby being malware; and
generating a first new policy consistent with the first existing policy, the first new policy to be enforced in a networking component, and comprising a first new condition having a first new corresponding action indicating that an alert is to be issued when matches between hashes of packet payloads in traffic to a connection of the network component and hashes associated with the file exceed a threshold percentage.

15. A computer program product, comprising a non-transitory computer-readable medium having a computer-readable program code embodied therein, the computer-readable program code adapted to be executed by one or more processors to implement a method comprising:

obtaining a plurality of existing policies that are enforced at or above an operating system (OS) layer of a device;

storing a plurality of translation rules comprising data structure descriptions of conditions, corresponding actions performed when the conditions are satisfied, and attributes specified in the existing policies, and attributes of one or more layers below the OS layer that are relevant to policy enforcement in the one or more layers below the OS layer;

parsing, using the data structure descriptions, the plurality of existing policies to identify the conditions, corresponding actions, and attributes specified in the existing policies;

generating a plurality of new policies consistent with the plurality of existing policies, the new policies comprising the identified attributes specified in the existing policies, and the attributes relevant to policy enforcement in the one or more layers below the OS layer; and enforcing the new policies in the one or more layers below the OS layer of the device, wherein the OS layer is above an infrastructure-as-a-service (IaaS) layer, and the one or more layers below the OS layer are within the IaaS layer.

16. The computer program product of claim 15 wherein the plurality of existing policies are specified at a first level of abstraction and the method comprises specifying the plurality of new policies at a second level of abstraction, lower than the first level of abstraction.

17. The computer program product of claim 15 wherein the method comprises:

obtaining a first existing policy that is enforced at or above the OS layer;

generating first and second new policies, each of the first and second new policies being based on and consistent with the first existing policy;

enforcing the first new policy in a first backend component, the first backend component being in the one or more layers below the OS layer; and enforcing the second new policy in a second backend component, different from the first backend component, the second backend component being in the one or more layers below the OS layer.

18. The computer program product of claim 15 wherein the method comprises:

obtaining a first existing policy that is enforced at or above the OS layer;

parsing the first existing policy to identify an attribute corresponding to a time period, and a condition having a corresponding action indicating that updates to system files are allowed only during the time period; and generating a first new policy consistent with the first existing policy, the first new policy to be enforced in a file system of a network attached storage (NAS), and comprising a first new condition having a first new corresponding action indicating that write operations to a particular directory of the NAS outside the time period are to be blocked, wherein the particular directory stores system files.

19. The computer program product of claim 15 wherein the method comprises:

obtaining a first existing policy that is enforced at or above the OS layer;

parsing the first existing policy to identify an attribute corresponding to a time period, and a condition having a corresponding action indicating that updates to system files are allowed only during the time period; and generating a first new policy consistent with the first existing policy, the first new policy to be enforced in a networking component, and comprising a first new condition having a first new corresponding action indicating that traffic to a specific firewall port number outside the time period is to be blocked, wherein the specific firewall port number is used to update the system files.

20. The computer program product of claim 15 wherein the method comprises:

obtaining a first existing policy that is enforced at or above the OS layer;

parsing the first existing policy to identify an attribute corresponding to a file, and a condition having a corresponding action indicating that the file is to be quarantined, the file thereby being malware;

generating a first new policy consistent with the first existing policy, the first new policy to be enforced in a block storage component, and comprising a first new condition having a first new corresponding action indicating that an alert is to be issued when matches between hashes of consecutive data sequences of data sent to the block storage component and hashes associated with the file exceed a threshold percentage; and generating a second new policy consistent with the first existing policy, the second new policy to be enforced in a networking component, and comprising a second new condition having a second new corresponding action indicating that an alert is to be issued when matches between hashes of packet payloads in traffic to a connection of the network component and hashes associated with the file exceed the threshold percentage.

* * * * *